(12) United States Patent
Strauss et al.

(10) Patent No.: US 11,140,026 B1
(45) Date of Patent: *Oct. 5, 2021

(54) DYNAMIC NETWORK ADDRESS SPACE ALLOCATION FOR VIRTUAL NETWORKS

(71) Applicant: Amazon Technologies, Inc., Seattle, WA (US)

(72) Inventors: Benjamin David Strauss, Bethesda, MD (US); David Brian Lennon, Reston, VA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/870,061

(22) Filed: May 8, 2020

Related U.S. Application Data

(63) Continuation of application No. 15/794,584, filed on Oct. 26, 2017, now Pat. No. 10,693,715.

(51) Int. Cl.
*G06F 15/177* (2006.01)
*H04L 12/24* (2006.01)
*H04L 12/46* (2006.01)
*H04L 29/12* (2006.01)

(52) U.S. Cl.
CPC ...... *H04L 41/0803* (2013.01); *H04L 12/4641* (2013.01); *H04L 61/1511* (2013.01); *H04L 61/2007* (2013.01); *H04L 61/255* (2013.01)

(58) Field of Classification Search
CPC ............. H04L 41/0803; H04L 12/4641; H04L 61/1511; H04L 61/255; H04L 61/2007
See application file for complete search history.

(56) References Cited

U.S. PATENT DOCUMENTS

| 6,587,455 B1 * | 7/2003 | Ray ..................... H04L 12/4641 370/352 |
| 6,687,755 B1 | 2/2004 | Ford et al. |
| 7,181,535 B1 * | 2/2007 | Remael ................... H04L 29/06 709/242 |
| 7,277,453 B2 * | 10/2007 | Chin ................. H04L 29/12066 370/392 |
| 7,533,164 B2 * | 5/2009 | Volz .................. H04L 29/12066 709/223 |
| 7,814,232 B2 * | 10/2010 | Satapati .............. H04L 61/6022 709/249 |

(Continued)

OTHER PUBLICATIONS

Wikipedia, "Classless Inter-Domain Routing", Aug. 14, 2017, pp. 1-7, Retrieved from the internet: https://en.wikipedia.org/wiki/Classless_Inter-Domain_Routing.

(Continued)

*Primary Examiner* — Razu A Miah
(74) *Attorney, Agent, or Firm* — NDWE LLP

(57) ABSTRACT

Techniques for dynamic allocation of network address spaces in virtual networks implemented in a service provider system are described. Upon a scaling condition of an allocation rule being determined to be satisfied, a network address space of a virtual network can be automatically expanded or contracted. The scaling condition can be specified by a customer associated with the virtual network. The allocation rule may also include a allocation factor that indicates an amount of network addresses that are to be added to or removed from the virtual network.

20 Claims, 11 Drawing Sheets

(56) References Cited

U.S. PATENT DOCUMENTS

| | | | |
|---|---|---|---|
| 8,346,850 B2 | 1/2013 | Eriksson | |
| 8,418,243 B2 | 4/2013 | Venkatraman et al. | |
| 8,594,026 B1 | 11/2013 | Hirschman et al. | |
| 8,751,691 B1 | 6/2014 | Brandwine et al. | |
| 2001/0044842 A1 | 11/2001 | Kawakami | |
| 2001/0054101 A1 | 12/2001 | Wilson | |
| 2002/0013844 A1 | 1/2002 | Garrett et al. | |
| 2003/0056008 A1 | 3/2003 | Russell et al. | |
| 2003/0117954 A1 | 6/2003 | De Neve et al. | |
| 2004/0093430 A1* | 5/2004 | Thomas | H04L 29/12433 709/245 |
| 2004/0098506 A1* | 5/2004 | Jean | H04L 61/2015 709/245 |
| 2005/0273570 A1* | 12/2005 | DeSouter | G06F 12/1045 711/203 |
| 2006/0015642 A1* | 1/2006 | Scheering | H04L 67/30 709/238 |
| 2008/0130661 A1* | 6/2008 | Jiang | H04L 61/6077 370/401 |
| 2008/0140813 A1* | 6/2008 | Ratcliff | H04L 12/10 709/220 |
| 2008/0256237 A1* | 10/2008 | Liu | H04L 47/765 709/226 |
| 2009/0248873 A1* | 10/2009 | Johnsson | H04L 61/1511 709/226 |
| 2009/0285216 A1* | 11/2009 | Thubert | H04L 69/16 370/392 |
| 2009/0287848 A1 | 11/2009 | Kamura et al. | |
| 2012/0005724 A1 | 1/2012 | Lee | |
| 2012/0011274 A1 | 1/2012 | Moreman | |
| 2012/0072694 A1* | 3/2012 | Yochai | G06F 3/0638 711/170 |
| 2012/0297037 A1* | 11/2012 | Kumagai | H04L 12/4641 709/222 |
| 2013/0007233 A1* | 1/2013 | Lv | H04L 61/2038 709/222 |
| 2013/0044719 A1* | 2/2013 | Khalil | H04L 61/2076 370/329 |
| 2013/0103836 A1 | 4/2013 | Baniqued et al. | |
| 2013/0275608 A1 | 10/2013 | Tan et al. | |
| 2013/0297824 A1 | 11/2013 | Lan et al. | |
| 2014/0052877 A1 | 2/2014 | Mao | |
| 2014/0123270 A1 | 5/2014 | Liu et al. | |
| 2014/0241267 A1* | 8/2014 | Cherian | H04W 12/0609 370/329 |
| 2015/0032869 A1* | 1/2015 | Chan | H04L 61/2076 709/221 |
| 2015/0067112 A1 | 3/2015 | Gokhale | |
| 2015/0089061 A1 | 3/2015 | Li et al. | |
| 2015/0100674 A1* | 4/2015 | Chiche | H04L 41/0806 709/222 |
| 2015/0134853 A1* | 5/2015 | Verwoerd | H04L 61/1511 709/245 |
| 2015/0237002 A1* | 8/2015 | Baniqued | H04L 61/2015 709/220 |
| 2015/0304384 A1* | 10/2015 | Lee | H04L 67/02 709/203 |
| 2015/0304450 A1* | 10/2015 | van Bemmel | H04L 12/4641 709/217 |
| 2015/0341221 A1 | 11/2015 | Vatnikov | |
| 2016/0072763 A1* | 3/2016 | Short | H04L 61/2592 726/15 |
| 2016/0087840 A1* | 3/2016 | Miller | H04L 45/02 709/221 |
| 2016/0380789 A1* | 12/2016 | Gunnalan | H04L 61/2007 709/228 |
| 2020/0084103 A1* | 3/2020 | Miller | H04L 45/02 |

OTHER PUBLICATIONS

"Getting Started with Amazon VPC", Aug. 14, 2017, pp. 1-26, Retrieved from the internet: http://docs.aws.amazon.com/AmazonVPC/latest/GettingStartedGuide/getting-started-ipv4.html#getting-started-create-vpc.

RFC 1918: Rekhter, et al., "Address Allocation for Private Internets," Feb. 1996, 9 pages, Best Current Practice, Network Working Group, Request for Comments: 1918.

RFC 4193: Hinden, et al., "Unique Local IPv6 Unicast Addresses," Oct. 2005, 16 pages, Standards Track, Network Working Group, Request for Comments: 4193.

"Amazon Virtual Private Cloud: User Guide," Copyright 2017, 296 pages, Sep. 26, 2017, Retrieved from the internet: https://docs.aws.amazon.com/AmazonVPC/latest/UserGuide/vpc-ug.pdf.

Non-Final Office Action for U.S. Appl. No. 15/794,584, dated Oct. 3, 2019, 17 pages.

Notice of Allowance for U.S. Appl. No. 15/794,584, dated Feb. 10, 2020, 11 pages.

* cited by examiner

DYNAMIC NETWORK ADDRESS SPACE ALLOCATION FOR VIRTUAL NETWORKS

CROSS-REFERENCE TO RELATED APPLICATIONS

This application is a continuation of U.S. application Ser. No. 15/794,584, filed Oct. 26, 2017, which is hereby incorporated by reference.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical computing machine to be shared among multiple users by providing each user with one or more virtual machines hosted by the single physical computing machine, with each such virtual machine being a software simulation acting as a distinct logical computing system that provides users with the illusion that they are the sole operators and administrators of a given hardware computing resource, while also providing application isolation and security among the various virtual machines. Furthermore, some virtualization technologies are capable of providing virtual resources that span two or more physical resources, such as a single virtual machine with multiple virtual processors that spans multiple distinct physical computing systems. As another example, virtualization technologies may allow data storage hardware to be shared among multiple users by providing each user with a virtualized data store which may be distributed across multiple data storage devices, with each such virtualized data store acting as a distinct logical data store that provides users with the illusion that they are the sole operators and administrators of the data storage resource.

BRIEF DESCRIPTION OF DRAWINGS

Various embodiments in accordance with the present disclosure will be described with reference to the drawings, in which.

DETAILED DESCRIPTION

Figure 1:
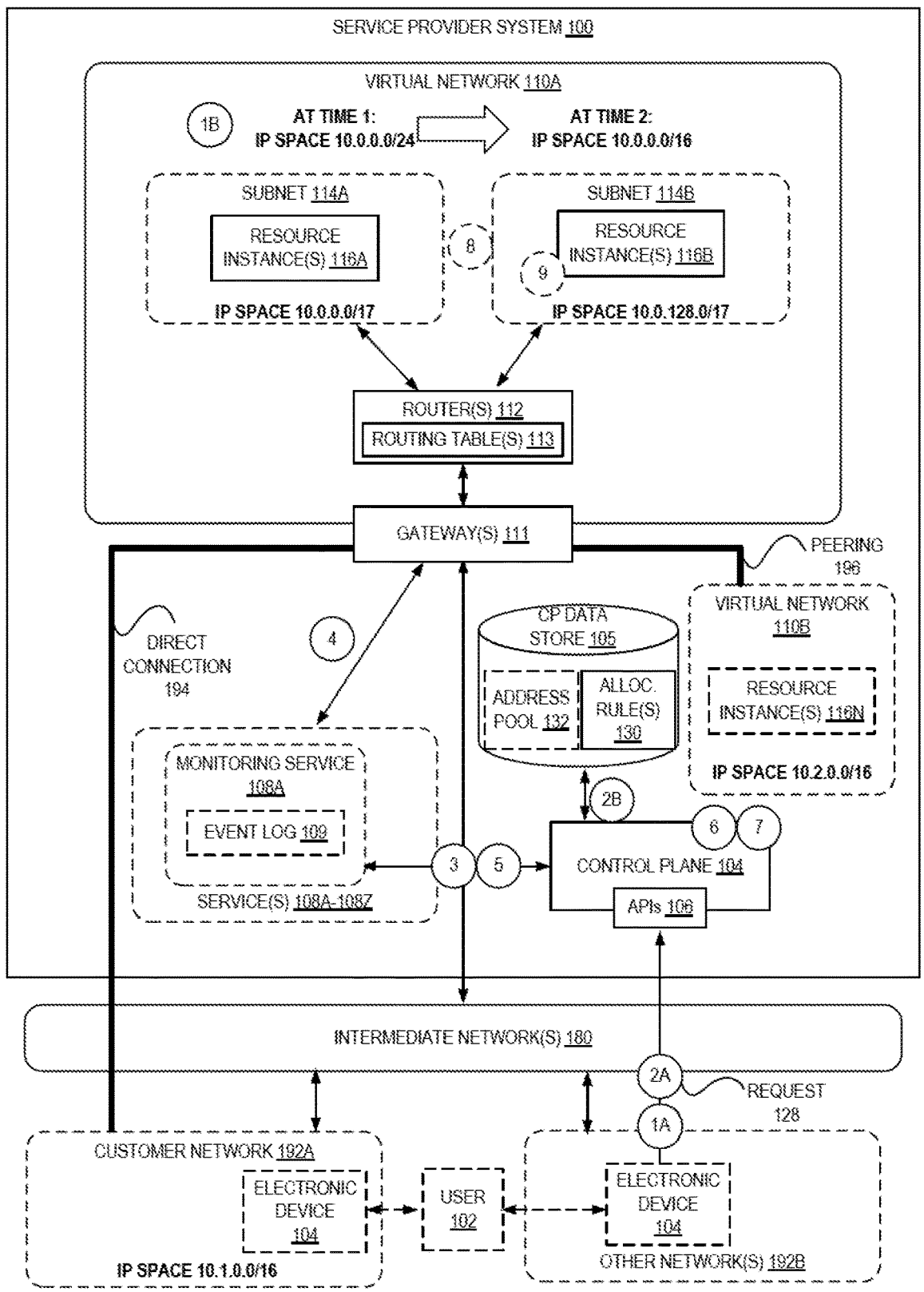
FIG. 1 is a block diagram illustrating dynamic network address space allocation for virtual networks according to some embodiments.

Various embodiments of methods, apparatus, systems, and non-transitory computer-readable storage media for dynamic network address space allocation for virtual networks are described. Embodiments can, for example, be implemented in the context of a service provider system that provides virtualized resources, such as computing resources executing as virtual machines (VMs), etc., as well as other virtual resources such as virtual storage, to customers via an intermediate network such as the Internet. The service provider system can include a network substrate and a control plane implemented by one or more data centers, and can host one or more virtual computing services and applications programming interfaces (APIs) allowing customers to establish, provision, and manage their virtualized resources in virtual networks (also referred to herein as "private networks") implemented within the service provider system.

In virtual network environments that allow customers to provision virtual networks, the customers' virtual network (s) may be discrete, routed Internet Protocol (IP) containers that are hosted on the provider network and that may be viewed as virtual analogs to physical data centers. A virtual network may be launched in a service provider system with a customer-specified IP address space (e.g., an Internet Protocol Version 4 (IPv4) Classless Inter-Domain Routing (CIDR) block, e.g., 172.31.0.0/20 or 10.0.0.0/16, or alternatively an Internet Protocol Version 6 (IPv6) CIDR block, e.g., 2600:1f16:67d:2000:156), which may be referred to as a local or private (to the virtual network) IP address space. In some embodiments, virtual networks may be required to use IP address ranges within the private IP address spaces as defined by Internet Engineering Task Force (IETF) Request for Comments (RFC) 1918 for IPv4 as their local IP address space:

10.0.0.0-10.255.255.255 (10/8 prefix)
   172.16.0.0-172.31.255.255 (172.16/12 prefix)
   192.168.0.0-192.168.255.255 (192.168/16 prefix)

In some embodiments, virtual networks may use IP address ranges within the private IP address space as defined by RFC 4193 for IPv6 (fc00::/7) as their local IP address space. In some embodiments, virtual networks use public IPv4 or IPv6 address ranges in their virtual networks as their local IP address space.

In some embodiments, a customer may also specify one or more subnets in their virtual network's IP address space. In some embodiments, a subnet can be specified as the same CIDR block as the virtual network (providing a single subnet in the virtual network), or alternatively one or more CIDR blocks that are subsets of the CIDR block of the virtual network can be specified to provide one or more subnets in the virtual network. As one example, a customer could create a virtual network with the CIDR block 10.0.0.0/24, which supports 256 IP addresses. The customer may, for example, break this CIDR block into two subnets, each supporting 128 IP addresses. One subnet uses CIDR block 10.0.0.0/25 (for addresses 10.0.0.0-10.0.0.127) and the other uses CIDR block 10.0.0.128/25 (for addresses 10.0.0.128-10.0.0.255).

Service provider systems may or may not allow customers to add additional IP address spaces to their virtual networks. When customers are not able to add additional IP address spaces, the customers may have to predict the IP address space requirements for their virtual networks when initially creating the networks. However, over time, resource usage in a virtual network may outgrow the initial IP address space. This may cause problems for customers who underestimate the growth potential for their virtual networks, and who later find that resource usage in their virtual networks outgrow the initially specified IP address spaces. A customer may allocate a much larger initial IP address space for a virtual network than the network may ever need; however, customers may have many virtual networks on the provider network, as well as external networks, that may be interconnected and that thus may have to share IP address space and avoid overlapping IP address ranges, and thus customers may need to use their IP address space efficiently.

Additionally, in a service provider system where a customer could be able to add additional IP address spaces to their virtual networks, properly adding and using such network address ranges can be extremely difficult and error prone. For example, customers may need to perform fairly involved mathematical operations to identify network address ranges—which may or may not be contiguous—that would satisfy the needs of the customers. These operations can become non-trivial, especially when multiple virtual networks (and potentially, one or more external networks such as an external data center or "office" network) may share an address space with the virtual networks being modified. Thus, if a customer does not select and configure proper network address ranges for a particular environment, the functioning of the entire virtual network (and associated systems/connected networks) may be impaired or destroyed.

Accordingly, embodiments for dynamic network address space management in virtual networks are described that allow for IP address spaces for a virtual network to automatically be enlarged or shrunk based on one or more allocation rules. In some embodiments, conditions of the one or more allocation rules can be selected and/or customized by the customers to define when a network address space is to be modified. Upon a condition being satisfied, the service provider system can automatically, quickly, and safely increase or decrease the network address space(s) of a virtual network, according to a dynamic allocation configuration, without requiring customer interaction and without inadvertently crippling a virtual network due to misconfigurations of customers.

For example, upon a particular condition being satisfied—such as a certain threshold amount of IP addresses (or percentage of an IP address space) being utilized within a virtual network, the service provider system can automatically "scale up" the network address space by adding additional IP address spaces (e.g., additional CIDR blocks, for example 10.1.0.0/16, 11.0.0.0/20, etc.) to the existing virtual network (e.g., created with an initial CIDR block of 10.0.0.0/24). As used herein, the terms network address "scaling" or "allocation"—and network address space management—may be used somewhat synonymously to indicate that a network address space may be dynamically increased and/or decreased in size.

FIG. 1 is a block diagram illustrating dynamic network address space allocation for virtual networks according to some embodiments. Note that the IP address spaces used in the Figures are given by way of example, and are not intended to be limiting.

FIG. 1 illustrates an example virtual network 110A with an initial IP address space of (10.0.0.0/24). A customer (here, represented as user 102) may provision and manage a virtual network 110A of the service provider system 100, which may occur from an external network 192B (or customer network 192A) over an intermediate network 180 such as the Internet via one or more APIs 106 to a control plane 104 of the service provider system 100, as shown at circle '1A'. For example, the customer may manage their private network 110A from graphical user interfaces (GUIs) and/or command line interfaces (CLIs) from a console (e.g., electronic device), which may be in customer network 192A or 192B, that issues API calls to one or more API endpoints (e.g., APIs 106) of the service provider system 100 to request that certain provisioning/management operations be performed. For example, the user 102 may configure, via one or more API calls (e.g., HyperText Transfer Protocol (HTTP) GET or POST messages sent that call/identify "exposed" functions of the API) at circle '1A', one or more resource instances 116A-116B and/or a virtual network 110A to be implemented and configured at circle '1B' perform certain operations. In some embodiments using an API, the API is a REpresentational State Transfer (REST) (or "RESTful") web service and thus the API requests may adhere to a set of uniform, predefined stateless operations. Note that virtual network 110A may include other components than those shown in FIG. 1.

Virtual network 110A may include resource instances 116A-116B such as virtual machines executed on host devices of the service provider system 100. Virtual network 110A may also include networking devices such as one or more gateways 111 and/or one or more routers 112. In at least some embodiments of a service provider system 100, virtual network 110A networking devices such as gateways 111 and routers 112A may be virtual networking devices (e.g., implemented as a software entity, which may execute on general purpose or specialized hardware) of the service provider system 100. A virtual gateway 111 or router 112 may, for example, be implemented in the hypervisor on a host device. A hypervisor, or virtual machine monitor (VMM), on a host device may be described as the software, firmware, and/or hardware that provides an execution environment for the virtual machines on the host device. Network traffic to and from the virtual machines executing on a host device may pass through and be processed by the hypervisor on the host device. Alternatively, a gateway 111 or router 112 may be implemented as a virtual machine executing on a host device of the service provider system 100. As another possibility, a gateway 111 or router 112 may be implemented as a physical networking device of the service provider system 100, or as a virtual device on a networking device of the service provider system 100.

In some embodiments, the service provider system 100 allows the customer to establish a dedicated network connection, referred to as a direct connection 194, from a customer network 192A (e.g., located outside the service provider system 100) to virtual network 110 within the service provider system 100. The direct connection 194 may, for example, be established between a gateway 111 of virtual network 110A (e.g., a "virtual private gateway") and a gateway at customer network 192A. A direct connection 194 may be a private communications channel, and may provide secure communications and higher bandwidth throughput than is available over an Internet-based connection. Once a direct connection 194 is established between virtual network 110A and customer network 192A, routing tables 113 used by router(s) 112 in private network 110A and router(s) in customer network 192A may be configured with routes for the direct connection 194, and endpoints in the two networks may then begin communicating over the direct connection 194. In some embodiments, virtual network 110A is not allowed to have any IP address space(s) that overlap with the IP address space(s) of an external customer network 192A to which a direct connection 194 is established.

Conventionally, packet flows between endpoints (resource instances 116A and 116N, for example) in different private networks 110 of the service provider system 100 are routed through the network substrate of the service provider system 100 to an intermediate public network 180 such as the Internet. The intermediate network 180 routes the packets back to the service provider system 100. In the service provider system 100, the packets are then routed over the network substrate to the destination private network. In some embodiments of a service provider system 100, to provide a virtual analog to physical transit centers at which physical cables between data centers are patched to create a peering between the respective private networks at the data centers in the virtual network environment within a service provider system 100, a peering service and API may be provided that allow customers to request and accept virtual peerings 196 between virtual networks 110A-110B of the service provider system 100. A private network peering 196 allows packets to flow between endpoints in the two private networks 110A-110B via the service provider system 100 network substrate without passing through the intermediate public network 180. Once a peering 196 is established between two virtual networks 110A-110B, routing tables (e.g., routing table(s) 113) used by router(s) 112 in the private networks 110 may be configured with routes to the peering 196 connection, and endpoints in the two private networks 110 may then begin communicating over the peering 196 as if the two virtual networks 110 were connected by a physical cable. FIG. 1 shows a virtual peering 196 connection between virtual network 110A and virtual network 110B. In some embodiments, peered private networks 110 are not allowed to have overlapping IP address spaces.

In this example, virtual network 110A has been created with an initial IP address space (in this example, the IPv4 CIDR block 10.0.0.0/24), which allows for 256 distinct IP addresses. In this example, two subnets, subnet 114A with CIDR block 10.0.0.0/25 (allowing for 128 distinct IP addresses) and subnet 114B with CIDR block 10.0.0.128/25 (allowing for 128 distinct IP addresses), have been created in the IP address space of the virtual network 110A. Resource instance(s) 116A are assigned IP addresses in the IP network address space of subnet 114A, and resource instance(s) 116B are assigned IP addresses in subnet 114B. In some embodiments, each subnet 114A-114B may include at least one router 112 that acts to route traffic to (and from) resource instances 116A-116B of the respective subnet 114A-114B.

While not shown in FIG. 1, in some embodiments, a service provider system 100 may include one or more regional networks. Each regional network may include multiple availability zones. Each availability zone may be implemented by one or more data centers within the respective regional network; a data center may implement one or more availability zones. The availability zones in a regional network may be connected through low-latency links (e.g., dedicated high-bandwidth fiber-optic links) and collectively form the regional network. Communications between endpoints in different availability zones within a regional network may go over the intermediate network 180 or over the low latency links. When a customer creates a private network 110A in a regional network, the private network 110A may span all the availability zones in the regional network. After creating the private network 110A, the customer can add one or more subnets 114 in each availability zone. When a customer creates a subnet 114 for private network 110A in an availability zone, the customer may specify the CIDR block(s) for the subnet, which is a subset of the private network 110A CIDR block (10.0.0.0/25, in this example). In some embodiments, each subnet 114 resides entirely within one availability zone and does not span availability zones. By launching resource instances 116A-116B in separate availability zones, the customer can protect their applications from the failure of a single availability zone.

Control plane 104 may maintain metadata about private networks 110A-110B on provider network, for example in a control plane (CP) data store 105. CP data store 105 may include a descriptor record for each private network 110 in the service provider system 100. When a customer creates or modifies a virtual network (e.g., virtual network 110A), information about the private network 110A may be written to, updated in, or read from a descriptor record in data store 105 corresponding to that private network 110A at circle '1A'. A descriptor record for a private network may include descriptions of the private network's network address space (e.g., CIDR blocks). A descriptor record for a private network 110 may include one or more of, but is not limited to: the private network name, a private network identifier, one or more CIDR blocks of the private network 110, subnet(s) of the private network 110, information identifying other private networks 110 that are peered with the private network 110, information about external network(s) 192 that are connected with the private network 110 via direct connections 194, routing information for the private network 110, and so on.

Service provider system 100 may implement one or more services 108A-108Z that may perform various functionalities for private networks 110. For example, a (non-illustrated) metadata service may execute in the service provider system 100, for example on each on host device that executes VMs, that exposes an interface to resource instances 116 that allows an executing resource instance 116 to obtain metadata about its respective private network 110 (e.g., information about the private network's IP address space(s), etc.) and metadata about the resource instance 116 (e.g., its media access control (MAC) address, local IP address, etc.). As another example, a direct connect service may support the establishment and management of direct connections 194 to external networks 192 from private networks 110. As another example, a peering service may support the establishment and management of peering 196 connections between private networks 110.

As shown in FIG. 1, a customer network 192A has an IP address space 10.1.0.0/16, which does not overlap with the IP address space of private network 110A (10.0.0.0/24). Similarly, private network 110B has the IP address space 10.2.0.0/16 which does not overlap with the IP address space of private network 110A (or the IP address space of customer network 192A).

As shown in FIG. 1, endpoints on external networks 192 may communicate with endpoints of a private network 110A (e.g., resource instances 116A and 116B). Network traffic (e.g., IP packets) from the external endpoints to endpoints on the private network 110A are routed via the intermediate network 180 to an edge device of the service provider system 100. At the edge device, the packets may be encapsulated and routed over the network substrate of the service provider system 100 to a gateway 111 that controls public access to the virtual network 110A. The gateway 111 forwards network packets to routers 112 of the virtual network 110A, which route the packets to the appropriate resource instances 116A-116B on the respective subnets 114A-114B according to routing information maintained in route table(s) 113 for the private network 110A.

Figure 2:
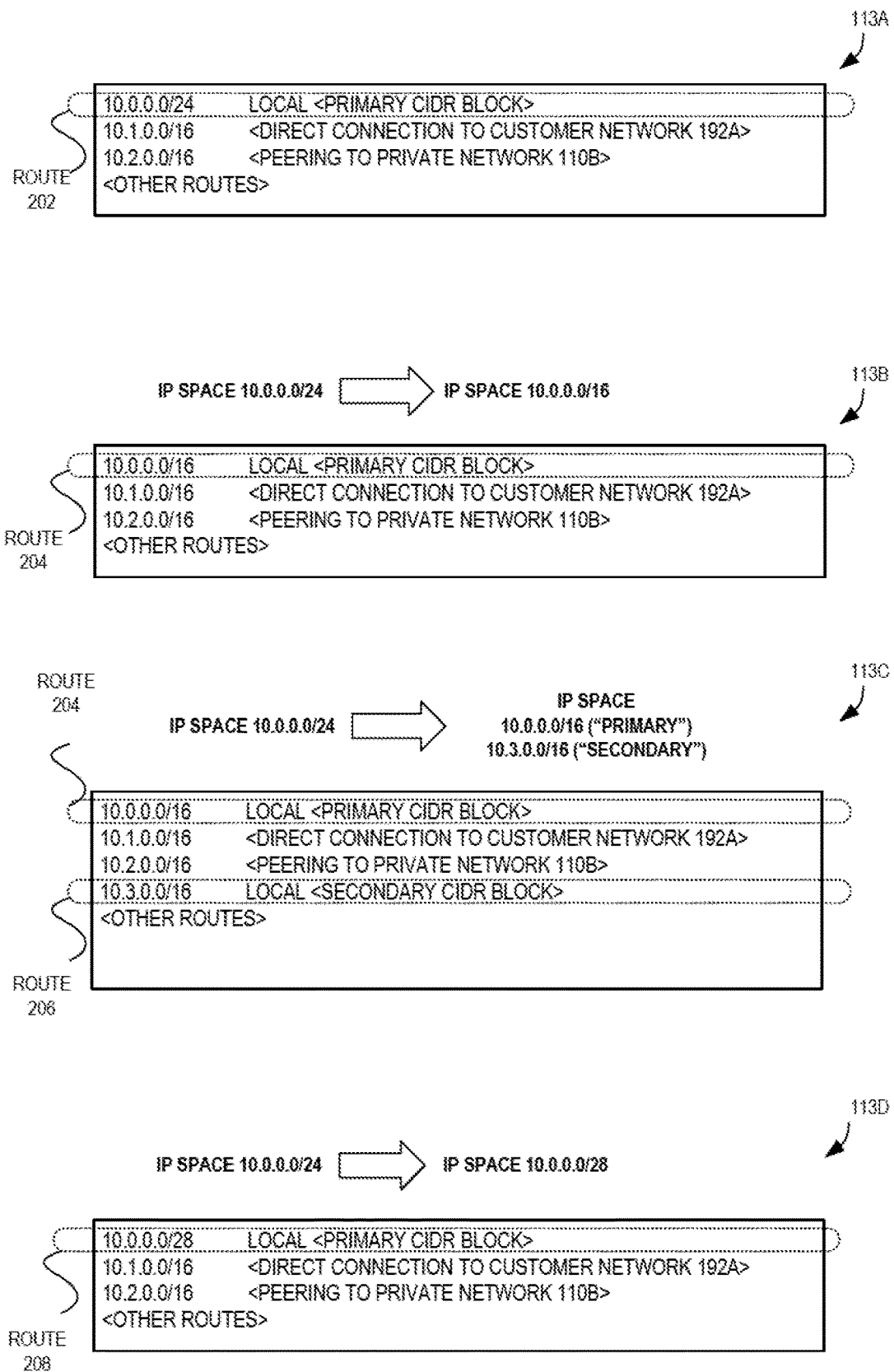
FIG. 2 is a diagram illustrating exemplary routing tables corresponding to various dynamic network address space allocation operations according to some embodiments.

FIG. 2 illustrates an example route table 113A for private network 110A, which includes a first route 202 for the private network 110A itself indicating that traffic destined to an address within that space (CIDR block 10.0.0.0/24) is to remain "local." The example route table 113A also includes a route for the direct connection to the customer network 192A, a route for the peering to the virtual network 110B, etc.

Turning back to FIG. 1, network traffic (e.g., IP packets) from the resource instances 116A-116B may be routed to the gateway 111, which sends the packets over the network substrate to an edge device of the service provider system 100 to be routed over the intermediate network 180 to respective endpoints on the external networks 192. Note that at least some endpoints of customer network 192A may also or instead communicate with resource instances 116A-116B on the private network 110A over direct connection 194. In addition, endpoints on private network 110B may communicate with resource instances 116A-116B through peering 196 connection.

In some embodiments, a customer may enable dynamic management of the network address space of one or more virtual networks 110A-110B. For example, a customer may issue a request 128 (at circle '2A') via an API 106 of the service provider system 100 to enable dynamic management of network address spaces for one or more virtual networks. For example, the request may configure an allocation rule to dynamically allocate (or "manage") a network address space for one or more virtual networks. The request 128 can be an HTTP request message carried by one or more packets that are destined to an API 106 endpoint of the service provider system 100. In some embodiments, a graphical user interface (GUI) to API 106 may be provided on a console on customer network 192A or other network 192B via which the customer may, for example, request dynamic network address management for private network 110A. In some embodiments, other methods may be used instead of or in addition to a GUI to access functionality of the API 106, including but not limited to using a command line interface (CLI).

Alternatively or additionally, in some embodiments, the service provider system 100 may enable dynamic allocation of network addresses on its own, such as during the creation of a virtual network, etc.

In some embodiments, the request 128 may be a "create virtual network scaling group" request that identifies one or more virtual networks that are to have their network addresses dynamically allocated. For example, the request 128 may include one or more identifiers of virtual networks.

The request 128, in some embodiments, specifies an allocation rule 130 indicating a condition that, when satisfied, indicates that a virtual network is to have its network address space dynamically changed (e.g., increased or decreased). The allocation rule 130 may be stored, at circle '2B', in the CP data store 105. As one example, a condition of an allocation rule 130 may indicate that when more or fewer than a threshold amount of network addresses are being used in a particular virtual network (or virtual networks), a dynamic allocation is to be performed. For example, a condition may indicate that when at least 80% (or 70%, 85%, 90%, etc.) of the addresses of a current network address space are being used, the network address space for the virtual network is to be scaled up—i.e., increased. As another example, a condition may indicate that when fewer than 40% (or 30%, 20%, etc.) of the addresses of a current network address space are being used, the network address space for the virtual network is to be scaled down—i.e., decreased.

Alternatively, in some embodiments the request 128 may not explicitly identify an allocation rule 130, instead allowing the service provider system to use its own allocation rule(s). This configuration can be beneficial in that it relieves the customer from needing to determine a condition, who can rely upon the service provider system to take care of the implementation of the dynamic management of network addresses. However, in some scenarios, a customer may have better visibility (or understanding) into the particular needs or future needs of the involved virtual network(s), and thus customer-specified conditions may also be beneficial.

In various embodiments, a condition can be specified in a variety of ways as (or including) a variety of types of data. For example, a condition could identify a numeric value (e.g., 80%) and a metric type (e.g., "number of IP addresses used in a virtual network"). As another example, the condition could be one of a set of enumerated values (e.g., "aggressive" or "medium" or "conservative", which could correspond to certain values such as 50%, 75%, or 90% of an address space being consumed) that indicate an aggressiveness for when scaling is to be performed.

In some embodiments, the allocation rule 130 may identify an allocation factor value that indicates how the network address space is to be modified. For example, an allocation factor value could indicate that the network address space is to be doubled (or halved), if possible given an amount of available address space. As another example, an allocation factor value could indicate that a particular size of network address range/block is to be added or removed (e.g., a/24 block). As another example, an allocation factor value could indicate that the network address size is to be expanded or decreased to a particular size—e.g., to expand to a full 10.0.0.0/16 CIDR block, to contract to a 10.0.0.0/24 CIDR block. Alternatively, in some embodiments the request 128 may not explicitly identify an allocation factor, instead allowing the service provider system to use its own allocation factor(s). Again, this configuration can beneficially relieve burdens on customers, though in some scenarios, a customer may have knowledge of what allocation factors will be appropriate, and thus customer-specified allocation factors may also be beneficial.

In some embodiments, the request 128 may include (or identify) an address pool 132 that defines a range or ranges of network addresses (e.g., one or more private network addresses such as IP addresses belonging to the address ranges defined by RFC 1918) that are available to be used within the virtual network 110A, or used across multiple virtual networks 110A-110B. For example, an address pool 132 could include a first CIDR block 10.0.0.0/16, a second CIDR block 10.2.0.0/16, etc. The address pool 132 may be stored in the CP data store 105. When a condition indicates that a dynamic allocation to add addresses is to be performed, the control plane 104 can select addresses to be added from the address pool, and may mark them as being used, etc. Similarly, when a condition indicates that a dynamic allocation to decrease addresses is to be performed, the control plane 104 may insert these addresses back into the address pool (e.g., actually insert them, mark them as available, etc.) In some embodiments, the address pool 132 can be used for multiple networks (e.g., multiple virtual networks) as a single source of network addresses. However, in some embodiments an address pool 132 is not utilized, and instead a number of private network address blocks/ranges can be drawn from defined private network address ranges, such as those defined by RFC 1918 and/or RFC 4193.

After receipt of the request 128, the control plane 104 may begin operations to determine whether the condition(s) of the allocation rule(s) 130 is satisfied.

For example, when a condition is based on a number of addresses being used/allocated, the control plane 104 may periodically access a CP data store 105 to access a management database storing records allowing the control plane 104 to make that determination.

As another example, as shown by circle '3', the control plane 104 may periodically monitor a monitoring service 108A to detect, via an event log 109 storing event records from within the service provider system 100, whether the condition is satisfied. In some embodiments, when a network address is newly being used or is eliminated from use (e.g., in a virtual network 110A via a resource instance 116 being created or destroyed), an "event" may be provided (e.g., at circle '4') to a monitoring service 108A to be stored in an event log 109. Thus, the control plane 104 at circle '3' may begin periodically issue requests to the monitoring service 108A to obtain a number of network addresses currently being used in a particular virtual network or networks, event log 109 records associated with a particular virtual network or networks, etc., thus allowing the control plane 104 to determine the network address space usage.

Alternatively, at circle '3' the control plane 104 may configure the monitoring service 108A to send an event notification to the control plane 104, thus relieving the need for the control plane 104 to periodically check in with the monitoring service 108A. The event notification may be sent upon particular types of events being received from a particular virtual network or networks (or sent upon the condition being satisfied), and may include the event itself, a value determined by the monitoring service 108A (e.g., a current number of network addresses in use), or an indicator that the allocation rule has been satisfied.

Additionally, other techniques for determining whether the condition(s) of the allocation rule(s) 130 is satisfied can be performed in other environments, such as via messaging performed between components within the control plane 104, messaging between the virtual network 110A and the control plane 104, etc., and thus these examples are to be viewed as illustrative.

Thereafter, due to a change associated with the virtual network 110A (e.g., a new IP address being used or allocated to an instance within the network, a new resource instance being launched), an event may be sent (e.g., from the virtual network 110A or another entity in the service provider system 100) to the monitoring service 108A at circle '4', where it may be stored in the event log 109. For the sake of explanation, we stipulate that this event causes the condition of an allocation rule 130 to be satisfied, and thus the control plane 104 at circle '5' may receive an indication from the monitoring service 108A that the condition is satisfied, or may receive the event (e.g., in response to having sent a request for recent events, etc.), or may receive a collection of recent events, etc., and thus determine that the condition was satisfied at circle '6' (e.g., by determining that it received an indication of the condition being satisfied, by determining that the received event or events satisfy the condition, etc.).

The control plane 104 may then, at circle '7', determine that a dynamic allocation is able to be performed, and cause a dynamic network address space allocation to be performed. As shown in FIG. 1, the satisfaction of the condition of the allocation rule 130 caused an increase in the size of the network address space, though in other scenarios and/or embodiments, the control plane 104 may instead cause a dynamic network address space allocation to be performed that decreases the network address space.

As illustrated, the IP address space at "time 1" of 10.0.0.0/24 is auto-scaled to become 10.0.0.0/16 at "time 2," which effectively increases the network address space size from 256 addresses to 65,534 addresses. For example, turning again to FIG. 2, at "time 1" the first route table 113A may be implemented for the virtual network with a first route 202 for the local address space (for 10.0.0.0/24), and upon the dynamic allocation to become 10.0.0.0/16, the route table may be modified to become the second illustrated route table 113B that utilizes a second route 204 (for 10.0.0.0/16). Thus, the first route 202 may be modified to become the second route 204 by changing the prefix length value from "24" to "16", or the first route 202 may be removed and then the second route 204 may be inserted.

As indicated above with regard to circle '7', in some embodiments, before the dynamic allocation of the network address space, the control plane 104 determines whether such an allocation can be performed. For example, when the allocation rule 130 indicates that the dynamic allocation is to increase a network address space by a particular amount, the control plane 104 may perform a set of conflict check operations. The conflict check operations may include determining whether a sufficient network address space is available that can be added, which can include determining whether one or more network address spaces exist in the address pool 132 that are not utilized, and that represent a sufficient number of network addresses sought to be added, and that do not create network address conflicts.

For example, in some embodiments dynamic allocation operations may not add CIDR blocks that overlap with other IP address spaces that are associated with the virtual network (e.g., the IP address space of external customer network 192A connected to the virtual network 110A via direct connection 194, and/or the IP address space of private network 110B connected to private network 110A through peering 196). For example, the control plane 104 may check one or more of, but not limited to, the IP address space(s) of one or more external networks 192 that are connected to virtual network 110A via a direct connection 194 (external customer network 192A, in this example), the IP address space(s) of one or more other virtual networks 110 that are connected to virtual network 110A through a virtual peering connection 196 (private network 110B, in this example), etc. In some embodiments, the control plane 104 may access private network 110A's descriptor record in CP data store 105 to obtain the IP address space and route information to be checked for overlaps with any new network addresses (e.g., CIDR block(s)).

To enlarge a network address space, in some embodiments it is possible to replace an existing route (of an initial network address space) with another route for a larger address space that may completely consume the initial network address space. Thus, although a "new" address space (e.g., 10.0.0.0/16) may technically "conflict" with the initial address space (e.g., 10.0.0.0/24), the dynamic allocation still may occur, e.g., by replacing an existing route for the address space (e.g., route 202) with a new route (e.g., route 204) or simply adding another route or routes to the route table.

In some scenarios, dynamic allocation may include both enlarging an address block (e.g., by modifying an existing route) as well as adding a new block (by adding a new route). For example, in FIG. 2 the third route table 113C reflects a dynamic allocation scenario where, in addition to expanding the initial network address space (e.g., route 204 is expanded to /16), additional network addresses may be added as a separate route 206—here, 10.3.0.0/16, which is in this case is referred to a "secondary" route. Thus, the initial address space of approximately 256 network addresses can be auto-scaled to approximately 131,068 network addresses. As used throughout, the "true" number of available network addresses indicated by a subnet (or subnets) may or may not be available to customers. For example, one or more of the addresses within an address space may be reserved for other purposes, such as broadcast transmission, service provider system 100 entities that support the virtual network, etc.

In some embodiments, the service provider system 100 via the set of conflict check operations, may impose one or more other restrictions on the IP address ranges that may be automatically added to private network 110A as part of dynamic allocation. For example, in some embodiments, the control plane 104 may also check to ensure that the requested IP address space does not violate any of one or more restrictions. As an example, in some embodiments, if private network 110A's initial IP address space is in one of the private IP address spaces as defined by RFC 1918 for IPv4, dynamic allocation may not be allowed to add address ranges from the other IPv4 private address spaces to private network 110A. As another example, in some embodiments, certain IP addresses and/or ranges may be used by service provider system 100 processes or services 108, and the customer may not be allowed to create private network 110A with an IP address space that overlaps the reserved ranges, or to add additional IP address spaces that overlap the reserved ranges.

Turning back to FIG. 1, to perform the dynamic allocation indicated by circle '7', the control plane 104 may configure the IP address space in the example virtual network. Upon determining that the "new" IP address space (e.g., CIDR block 10.0.0.0/16, in this example) does not overlap with IP address spaces that are associated with the virtual network 110A, and in some embodiments that the new IP address place does not violate one or more other restrictions, the control plane 104 may configure private network 110A with the new IP address space. In some embodiments, configuring private network 110A may include, but is not limited to, adding, removing, and/or modifying routes to route table(s) of private network 110A, so that traffic associated with network addresses of the "new" address space is kept within the virtual network.

As described above, FIG. 2 illustrates an initial route table 113A, and two different route tables 113B-113C resulting from a dynamic allocation that increased the network address space. FIG. 2 also shows, via route table 113D, a route table 113D resulting from a dynamic allocation where the network address space is decreased. As shown, the initial route 202 can be modified (or replaced) with a new route 208 for a smaller network address space (/28). Decreasing a network address space can be useful in a variety of scenarios, such as when an amount of IP addresses used within a virtual network consumes less than some threshold (e.g., one-half, one-third, one-fourth, etc.) of the addresses otherwise available in the network address space of the virtual network. By decreasing the size of the allowed network address space, embodiments can reduce the size of certain overhead within the service provider system for supporting a virtual network (e.g., through smaller routing tables, quicker lookups). Also, in some cases this "extra" network address space that is not being utilized—and thus is removed via dynamic allocation—can be re-used elsewhere, where extra network address space may be needed.

In some embodiments, when decreasing a size of a network address space, the control plane 104 identifies which range or ranges of addresses are to be removed from the address space. For example, the control plane 104 can identify the number of addresses to be removed (i.e., the "size" of the network address space to be eliminated), and identify whether there is a block—or multiple blocks, if need be—of addresses that are not being utilized and thus can be removed. As a result, a single route in a routing table may be modified (e.g., from a/20 to a/24), or a single route may be modified and/or replaced with one or more other routes.

In some embodiments, the control plane 104 may perform one or more other tasks to perform the dynamic allocation. For example, in some embodiments, the control plane 104 may update private network 110A's descriptor record to reflect the "new" IP address space.

In some embodiments, control plane 104 may write events indicating changes to private networks 110 to an event log 109 (e.g., of monitoring service 108A), which can allow other services 108B-108Z to asynchronously consume the events from event log 109 to update their information about private networks 110 and perform one or more tasks in response to the events as necessary. In these embodiments, control plane 104 may write an event to event log 109 indicating that a new IP address space has been added to or removed from the private network 110A, or indicating what the overall "new" IP address space is.

In some embodiments, control plane 104 may provide an indication to the customer (e.g., via API 106) that the network address space has been modified via dynamic allocation, which may identify the overall "new" address space and/or the previous address space.

While not shown in FIG. 1, in some embodiments, when the set of conflict check operations results in a determination that a dynamic allocation is not able to be performed (as indicated by the allocation rule(s) 130), the control plane 104 may stop trying to perform the dynamic allocation, or in some embodiments, may perform as much of the dynamic allocation as is possible. For example, if an allocation rule 130 indicates that an additional 256 network addresses are to be added to a virtual network, but only 128 network addresses remain available at the time of a dynamic allocation, the control plane 104 may halt performing the dynamic allocation, or may add some or all of the available network addresses (e.g., all of the 128 "available" network addresses, fewer than all 128 of the addresses to allow some remaining capacity). In some embodiments, when a "complete" dynamic allocation is not able to be performed, the control plane 104 may provide an indication to the customer that the complete dynamic allocation was not able to be performed, and may provide a reason why the dynamic allocation was not performed (e.g., that a new IP address space cannot be added due to the unavailability of a sufficient number of addresses within the address pool 132).

Upon the completion of a dynamic allocation of the network address space, the customer may then utilize the expanded or contracted dynamic allocation network address space as is normal; for example, at circle '8' a customer may add or modify a subnet to utilize new network address space.

However, in some embodiments, the control plane 104 may itself modify the size of existing subnets of the network based on the dynamic allocation. For example, if one subnet existed before the dynamic allocation that included the full size of the network address space, after the dynamic allocation the subnet could be modified (or removed and then a new one reconstructed) to match the "new" size of the network address space. Similarly, in some embodiments, if two subnets existed before the dynamic allocation that split the previous network address space in half, in some embodiments the control plane 104 could modify one or both of the subnets so that the updated network address space is fully and appropriately utilized.

For example, in some embodiments upon a size of a network address space being dynamically increased, an existing subnet may be likewise expanded, perhaps to cover the entire new size of the network address space, or may be left its previous size. As another example, in some embodiments during the process of decreasing a size of a network address space, one or more subnets may be checked to determine whether they can similarly be decreased in size to be covered within the new network address space. This check can include identifying whether ranges of a subnet that potentially could be eliminated (to move the subnet within a particular new network address space) do not include any utilized/assigned network addresses; if not, other checks can be performed to identify other possible ways to resize the network address space, warning or error messages can be generated, etc.

However, in some embodiments the control plane 104 may not auto-scale (or create new) subnets upon a dynamic allocation occurrence, and thus the customer may do this on their own. For example, a customer may be able to create a subnet in the "new" network address space. In some embodiments, once a new IP address space (e.g., CIDR block 10.0.0.0/16, in this example) has been created, the customer may specify one or more subnets 114 for the new IP address space. In some embodiments, the subnet may be specified as the same CIDR block as the new IP address space, or alternatively one or more CIDR blocks that are subsets of the new CIDR block can be specified to provide one or more subnets 110C in the new IP address space. In this example, CIDR block 10.0.0.0/17 has been specified as a subnet 114A for the new IP address space 10.0.0.0/16, and CIDR block 10.0.128.0/25 has been specified as a subnet 114A for the new IP address space 10.0.0.0/16. In some embodiments, at least one router 112 may be provisioned for the subnets, and one or more route tables 113 of virtual network 110A may be updated to include the new subnet(s).

In some embodiments, control plane 104 may perform one or more other tasks when creating a subnet. For example, in some embodiments, the control plane 104 may update the virtual network's descriptor record to add the subnet(s). In some embodiments, the control plane 104 may write an event to event log 109 indicating that the new subnet(s) have been created. In some embodiments, control plane 104 may provide an indication to the customer that the new subnet(s) have been created, for example via an interface displayed on a customer's console or via API 106.

In some embodiments, the customer may also add resources—e.g., resource instance(s) 116B—at circle '9' in the new IP address space for the example virtual network of FIG. 1. In some embodiments, once the auto-scaled network address space has been created and a subnet has been created (e.g., subnet 114B, in this example) in the updated network address space, a customer may add one or more resource instances 116B in the subnet 114B, for example via an interface displayed on the customer's console or via the APIs 106. The resource instances 116B can thus be assigned (or re-assigned) network addresses in subnet 114B.

Thereafter, when the auto-scaled network address space has been fully configured (if necessary) in the virtual network, endpoints on external networks 192 may communicate with endpoints on private network 110A (e.g., resource instances 116A-116B). Network traffic (e.g., IP packets) from the external endpoints to endpoints in the private network 110A are routed over the intermediate network 180 to an edge device of the service provider system 100. At the edge device, the packets may be encapsulated and routed over the network substrate of the service provider system 100 to a gateway 111 that controls public access to the private network 110A. The gateway 111 forwards network packets to routers 112 of the private network 110A, which route the packets to the appropriate resource instances 116A-116B on the respective subnets 114A-114B according to routing information maintained in route table(s) 113 for the private network 110A. Similarly, network traffic (e.g., IP packets) from the resource instances 116A-116B is routed to the gateway 111, which sends the packets over the network substrate to an edge device of the service provider system 100 to be routed over the intermediate network 180 to respective endpoints in the external networks 192. Note that at least some endpoints on customer network 192A may also or instead communicate with resource instances 116A-116B of the virtual network 110A over direct connection 194. In addition, endpoints (e.g., resource instances 116N) in virtual network 110B may communicate with resource instances 116A-116B through the peering 196 connection.

Figure 3:
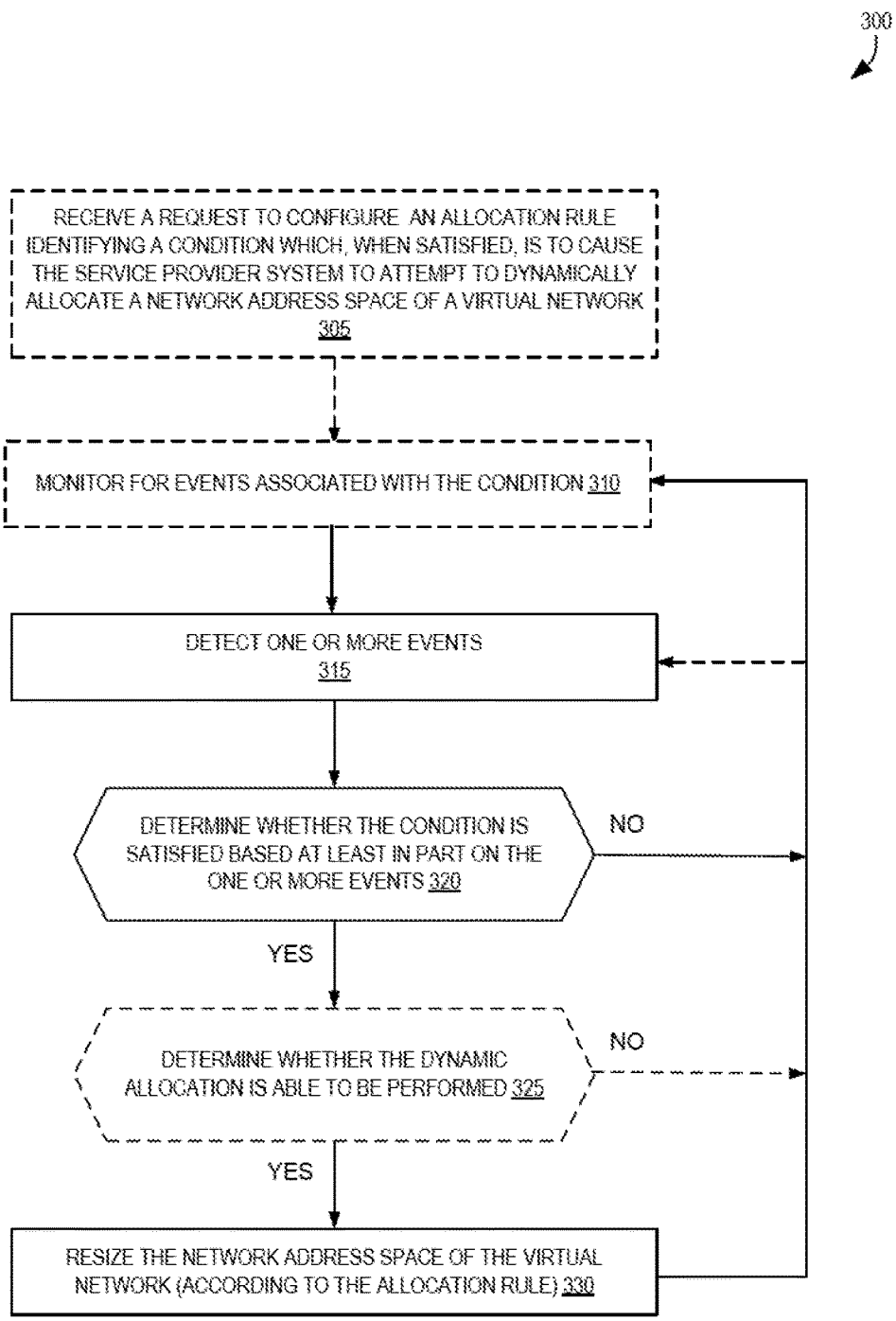
FIG. 3 is a flow diagram illustrating operations for dynamic network address space allocation for virtual networks according to some embodiments.

FIG. 3 is a flow diagram illustrating operations 300 for network address range dynamic allocation for virtual networks according to some embodiments. Some or all of the operations 300 (or any other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 300 are performed by the control plane 104 of the other figures.

The operations 300 optionally include, at block 305, receiving a virtual network scaling request identifying a dynamic allocation condition. The scaling condition, when satisfied, is to cause the service provider system to attempt to auto-scale a network address space of a virtual network.

In some embodiments, the virtual network scaling request is (or is carried by) an HTTP request message sent from a device of a customer via an API of the service provider system. The virtual network scaling request may specify an allocation rule that includes the scaling condition. In some embodiments, the virtual network scaling request includes an identifier of the virtual network (which may be unique across the service provider system, or unique only among virtual networks of a customer), and in some embodiments the allocation rule comprises an allocation factor that indicates whether the network address space is to be increased in size or decreased in size when the scaling condition is satisfied and/or indicates how large the change in size is to be. In some embodiments, the allocation factor indicates a number of addresses that the network address space is to be scaled up or down to. For example, in some embodiments the allocation factor specifies a number of network addresses, while in some embodiments the allocation factor specifies the size of an address block that the network address space is to be scaled to.

As indicated by the use of dashed lines, block 305 is optional in some embodiments. For example, in some embodiments the service provider system implements dynamic allocation of a virtual network that is not directly in response to a virtual network scaling request. For example, in some embodiments the service provider system enables dynamic allocation upon the creation of a virtual network, and may configure at least one "scale up" allocation rule (for adding additional network address space) and/or at least one "scale down" allocation rule (for removing network address space) for the virtual network.

In some embodiments, the scaling condition of the virtual network scaling request identifies one or more metrics that can be utilized to determine whether the scaling condition is satisfied. Thus, the scaling condition may be based at least in part on one or more metrics. In some embodiments, at least one metric comprises a current amount of network addresses used and/or assigned in the virtual network, and in some embodiments at least one metric comprises a current percentage of a network address space that is currently used and/or assigned in the virtual network.

In some embodiments, values for the one or more metrics can be obtained from a monitoring service within the service provider system. The virtual network may be adapted to publish an event to the monitoring service upon a network address being assigned or released within the virtual network, and the monitoring service may store the event in an event log.

In some embodiments, the operations 300 optionally include, at block 310, monitoring for events associated with the scaling condition. In some embodiments, monitoring includes sending one or more requests for events to the monitoring service, and optionally receiving one or more responses back from the monitoring service. In some embodiments, the monitoring service may be configured to transmit an event upon it receiving the event from the virtual network, and thus in some embodiments monitoring may include receiving one or more events from the monitoring service.

In other embodiments, block 310 includes querying (e.g., sending a query request to a service, and receiving a query response back from the service) an information service of the service provider system that maintains operational or configuration information of the service provider system for values of the one or more metrics. For example, block 310 may include sending a query for a number of IP addresses currently being used in a particular virtual network, and receiving a query response indicating a result of the service having executed that query (e.g., against a database of operational or configuration information).

The operations 300 include, at block 315, detecting one or more events. In some embodiments, the detecting comprises receiving an event (or a description of an event) indicating a value of a metric—e.g., a number of IP addresses currently being used in a particular virtual network—from a monitoring service or other service of the service provider system.

The operations 300 include, at block 320, determining whether the scaling condition is satisfied based at least in part on the one or more events. In some embodiments, the scaling condition is a logical statement that compares the value of the metric (e.g., of the one or more events) with another value using one or more comparison operators (e.g., equal to, not equal to, greater than, less than, greater than or equal to, etc.). Determining whether the scaling condition is satisfied includes, in some embodiments, evaluating the condition to determine whether it is true or false.

When the scaling condition is not satisfied, the flow may continue back to block 310 (or block 315), and continuing to monitor for events and/or detecting events. When the scaling condition is satisfied, the flow may continue to block 325.

The operations 300 optionally include, at block 325, determining whether the dynamic allocation is able to be performed. In some embodiments, block 325 includes identifying a number of network addresses that are to be added or removed to the network address space of the virtual network. The identifying may be based on a scaling value associated with the scaling condition, which may indicate a number of network addresses (e.g., an exact number of addresses, a size of an address block, a rate or percentage of increase or decrease) and may further indicate whether the number of network addresses are to be added or removed.

In some embodiments, when the scaling is to add additional network addresses to the network address space, the determining includes identifying, within a pool of network addresses associated with the customer, whether a range of addresses (e.g., a block of addresses) exists that are available for use and that include the number of network addresses to be added. In some embodiments, when the scaling is to remove network addresses from the network address space, the determining includes identifying whether there is a range of network addresses currently assigned to the virtual network that are not being used.

However, in some embodiments block 325 may not be utilized, as it is possible to configure dynamic allocation to be performed in scenarios where it is always possible to perform the dynamic allocation. As one simple example, it may be the case where a customer has one virtual network using a /24 block of a private address space (e.g., an RFC 1918 range of addresses, such as 10.0.0.0/24) and the scaling value may indicate that the network address space is to be expanded to a /16 block (e.g., to 10.0.0.0/16)—in this case, it may be the case that no such check (of block 325) is required.

Figure 4:
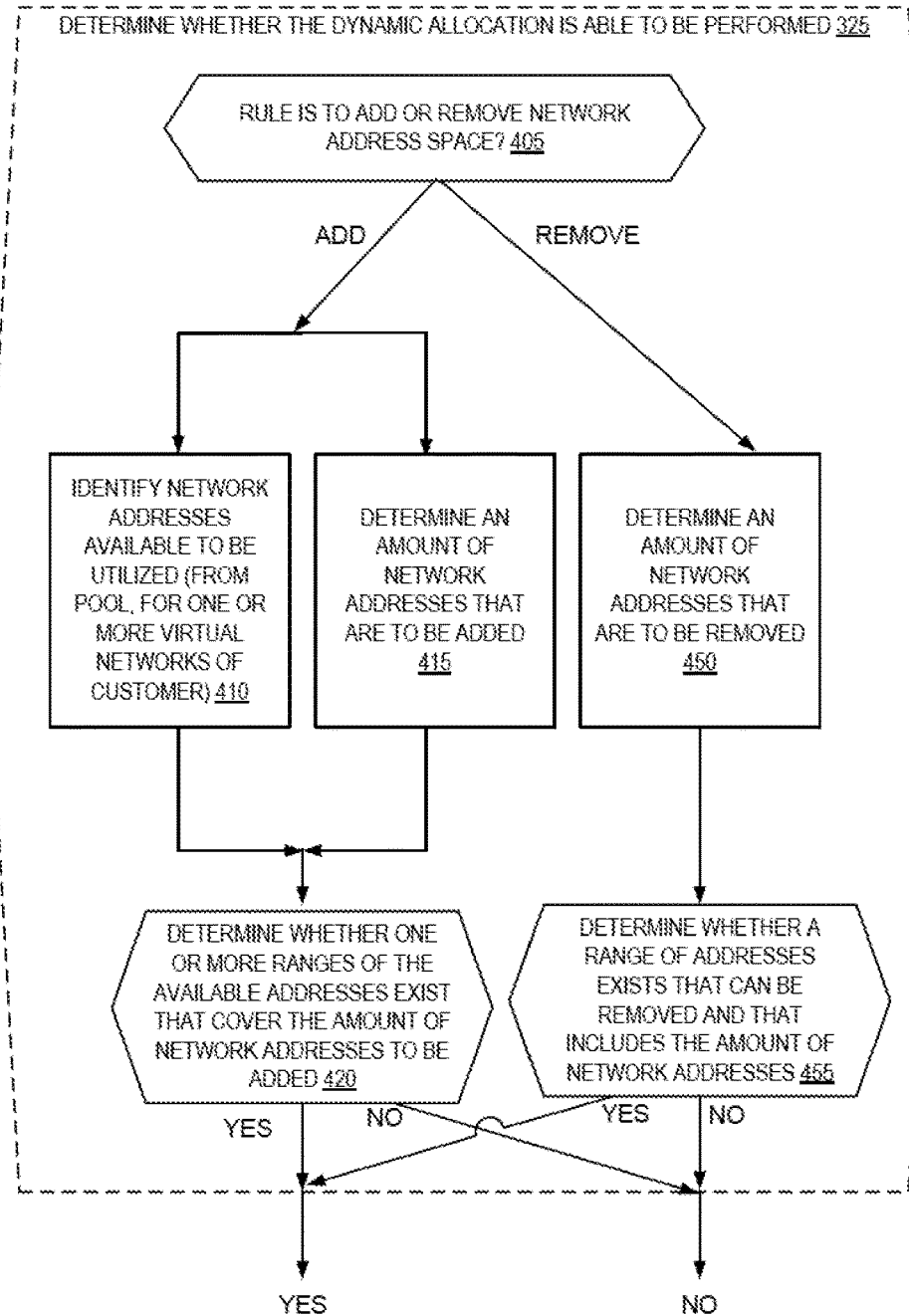
FIG. 4 is a flow diagram illustrating operations for determining whether dynamic allocation can be performed according to some embodiments.

For further detail regarding optional block 325, we turn to FIG. 4, which is a flow diagram illustrating some exemplary operations 400 for determining whether dynamic allocation is able to be performed according to some embodiments.

At decision block 405, the operations 400 include determining whether the scaling condition is to add or remove network address space. In some embodiments, the scaling value includes an identifier (e.g., a character such as "+" for add or "−" for remove, a string such as "add" or "remove", etc.) that can be obtained in block 405.

When the determination at block 405 results in network addresses being added, the operations 400 may include block 410 and 415, which can be performed sequentially in any order or in parallel. Block 410 includes identifying network addresses that are available to be utilized for the virtual network. In some embodiments, a pool of network addresses is provided by (or for) a customer that can be used by the virtual network, or can be used by multiple virtual networks of the customer. The pool of network addresses can include one or multiple different blocks of network addresses, which can be from different private network address ranges (e.g., 10.0.0.0/8 or 172.16.0.0/12 or 192.168.0.0/16, as a simple example).

Block 415 includes determining an amount of network addresses that are to be added for the virtual network. In some embodiments, block 415 includes identifying a scaling value of an allocation rule (that includes the scaling condition). The scaling value, in some embodiments, indicates a number of addresses to be added (e.g., an exact number of addresses that the scaled address space is to include, an exact number of addresses that are to be removed, a size of a block of network addresses that the scaled address space is to be).

At decision block 420, the operations 400 include determining whether one or more ranges of the available addresses exist that cover the amount of network addresses to be added. Block 420 can include, for example, determining whether one or more blocks of the addresses available to be utilized exist that provide enough network addresses. In some embodiments, the output of block 420 may serve as the output value of block 325.

When the determination at block 405 results in network addresses being removed, the operations 400 may include block 450, and determining an amount of network addresses that are to be removed. In some embodiments, block 450 includes identifying a scaling value of an allocation rule (that includes the scaling condition). The scaling value, in some embodiments, indicates a number of addresses to be removed (e.g., an exact number of addresses that the scaled address space is to include, an exact number of addresses that are to be removed, a size of a block of network addresses that the scaled address space is to be).

The operations 400 may then continue with decision block 455, and determining whether a range of addresses exists that can be removed and that includes the amount of network addresses. In some embodiments, blocks 455 includes determining whether there is a block (or multiple blocks) of network addresses currently in the network address space that are unused and that collectively include the determined amount of addresses to be removed.

Turning back to FIG. 3, the operations 300 also include, at block 330, resizing the network address space of the virtual network. In some embodiments, block 330 includes causing one or more routing tables to be updated (e.g., one or more routes inserted, modified, and/or removed) to reflect the scaling of the network address space. Optionally, in some embodiments block 330 includes one or more of: automatically resizing one or more subnets within the virtual network, sending an event to a monitoring service (e.g., writing the event to an event log) that indicates that the dynamic allocation has been performed (e.g., identifies the updated network address space), notifying a customer associated with the virtual network that the dynamic allocation has been performed, publishing updated routes to other networks, publishing updated IP address utilization information to a Domain Name Service (DNS) entity, etc.

Figure 5:
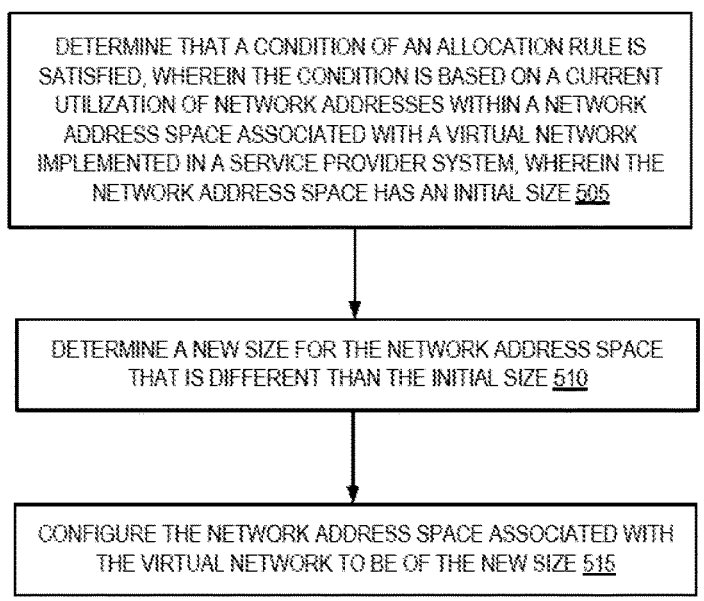
FIG. 5 is a flow diagram illustrating operations for dynamic network address space allocation for virtual networks according to some embodiments.

Another example set of operations is illustrated in FIG. 5, which is a flow diagram illustrating operations 500 for network address range dynamic allocation for virtual networks according to some embodiments. The operations 500 can be performed, for example, by the control plane 104 of FIG. 1.

The operations 500 include block 505, and determining that a condition of an allocation rule is satisfied. The condition (or scaling condition) is based on a current utilization of network addresses within a network address space associated with a virtual network implemented in a service provider system. The network address space has an initial size. The determining can include evaluating the condition based on one or more metric values to determine whether the condition is satisfied (e.g., evaluates to true, evaluates to false). The one or more metric values may be obtained from a monitoring service within the service provider system, and may indicate a current amount of network addresses used in the virtual network. The allocation rule may be specified by a customer via an API request message, or can be implemented by the service provider system on its own for the virtual network.

In some embodiments, the allocation rule is identified in a request that is received, via an application programming interface (API) of the service provider system, where the request is to configure the allocation rule to dynamically allocate the network address space for the virtual network. In some embodiments, the request further includes an allocation factor that indicates how the network address space is to be changed when the condition is satisfied.

The operations 500 also include, at block 510, determining a new size for the network address space that is different than the initial size. In some embodiments, the determining of block 510 includes identifying a scaling value of the allocation rule, which indicates an amount of network addresses to be added or removed for the virtual network, and determining the new size based on the allocation rule.

At block 515, the operations 500 include configuring the network address space associated with the virtual network to be of the new size. In some embodiments, block 515 includes updating one or more routes of one or more routing tables used for the virtual network within the service provider system. In some embodiments, block 515 further includes updating a size of one or more subnets based on the new size of the virtual network.

In some embodiments, the new size is larger than the initial size; prior to the configuring of the network address space to be of the new size, the network address space comprises a first range of network addresses; and after the configuring of the network address space to be of the new size, the network address space comprises a second range of network addresses.

In some embodiments, the second range of network addresses is contiguous with the first range of network addresses (and the new network address space may or may not include the first range of network addresses), and in some embodiments, the second range of network addresses is not contiguous with the first range of network addresses.

In some embodiments, the operations 500 further include receiving, via an API, a request that specifies at least one subnet for the virtual network that is to be configured within the second range of network addresses, and configuring the at least one subnet in the virtual network. In some embodiments, the operations 500 further comprise receiving, via the API, a request that indicates that one or more resource instances, such as one or more compute instances (e.g., a virtual machine (VM) using a guest operating system (O/S) that operates using a hypervisor that may or may not further operate on top of an underlying host O/S, a container that may or may not operate in a VM, an instance that can execute on "bare metal" hardware without an underlying hypervisor), are to be launched in the at least one subnet of the virtual network; launching the one or more resource instances; and assigning network addresses from the second range of network addresses to the one or more resource instances.

In some embodiments, the operations 500 further include determining that the second range of network addresses does not conflict with a third range of network addresses. The determining can include determining whether any of the second range of network addresses exists within the third range of network addresses.

In some embodiments, the third range of network addresses are of another virtual network implemented by the service provider system, wherein the another virtual network is connected to the virtual network via a peering connection. In some embodiments, the third range of network addresses are of another network that is external to the service provider system that is connected to the virtual network across an intermediate network.

In some embodiments, wherein the new size is smaller than the initial size. In some embodiments, the operations 500 further include determining that a range of network addresses that are within the network address space are not utilized, and block 515 includes removing the range of network addresses from the network address space.

In some embodiments, the operations 500 further include, after block 515, transmitting an indication that the size of the network address space has changed. The transmission may occur via an API of the service provider system (e.g., to the customer, to another system or service), via a notification service, etc.

For example, in some embodiments, one or more provider network service(s) may be informed of the new IP address space for the private network. For example, in some embodiments, the control plane may write events indicating changes to virtual networks in the service provider system to an event log via an API. Service provider system services (or other resource instances) that need this information may asynchronously consume the events from the event log, such as via an API, to update their information about the virtual networks and to perform one or more tasks in response to the changes as necessary. However, note that other techniques may be used instead of or in addition to the described techniques to inform other services that the address space has been modified (e.g., via the dynamic allocation).

Figure 6:
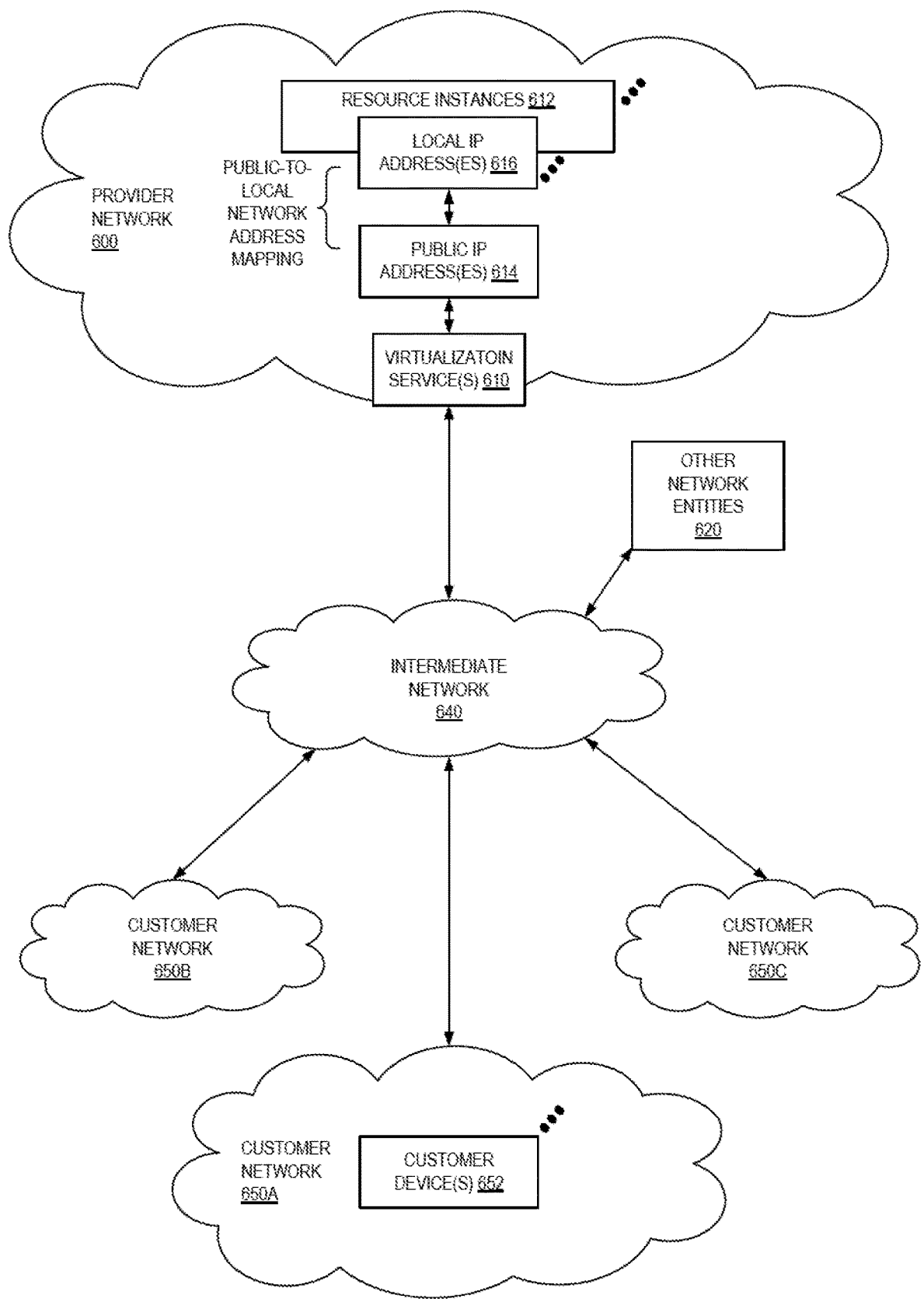
FIG. 6 illustrates an example provider network environment according to some embodiments.

FIG. 6 illustrates an example provider network (also referred to herein as a "service provider system") environment, according to some embodiments. A provider network 600 may provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local IP addresses 616 may be associated with the resource instances 612; the local IP addresses are the internal network addresses of the resource instances 612 on the provider network 600. In some embodiments, the provider network 600 may also provide public IP addresses 614 and/or public IP address ranges (e.g., Internet Protocol version 4 (IPv4) or Internet Protocol version 6 (IPv6) addresses) that customers may obtain from the provider 600.

Conventionally, the provider network 600, via the virtualization services 610, may allow a customer of the service provider (e.g., a customer that operates client network 650A) to dynamically associate at least some public IP addresses 614 assigned or allocated to the customer with particular resource instances 612 assigned to the customer. The provider network 600 may also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of customer network 650A may, for example, implement customer-specific applications and present the customer's applications on an intermediate network 66, such as the Internet. Other network entities 620 on the intermediate network 66 may then generate traffic to a destination public IP address 614 published by the customer network 650A; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 may be routed via the network substrate back onto the intermediate network 66 to the source entity 620.

Local IP addresses, as used herein, refer to the internal network addresses of resource instances in a provider network. Local IP addresses are only mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 network address translation (NAT), and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 600; a customer may then assign their allocated public IP addresses to particular resource instances allocated to the customer. These public IP addresses may be referred to as customer public IP addresses, or simply customer IP addresses.

Instead of being assigned by the provider network 600 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
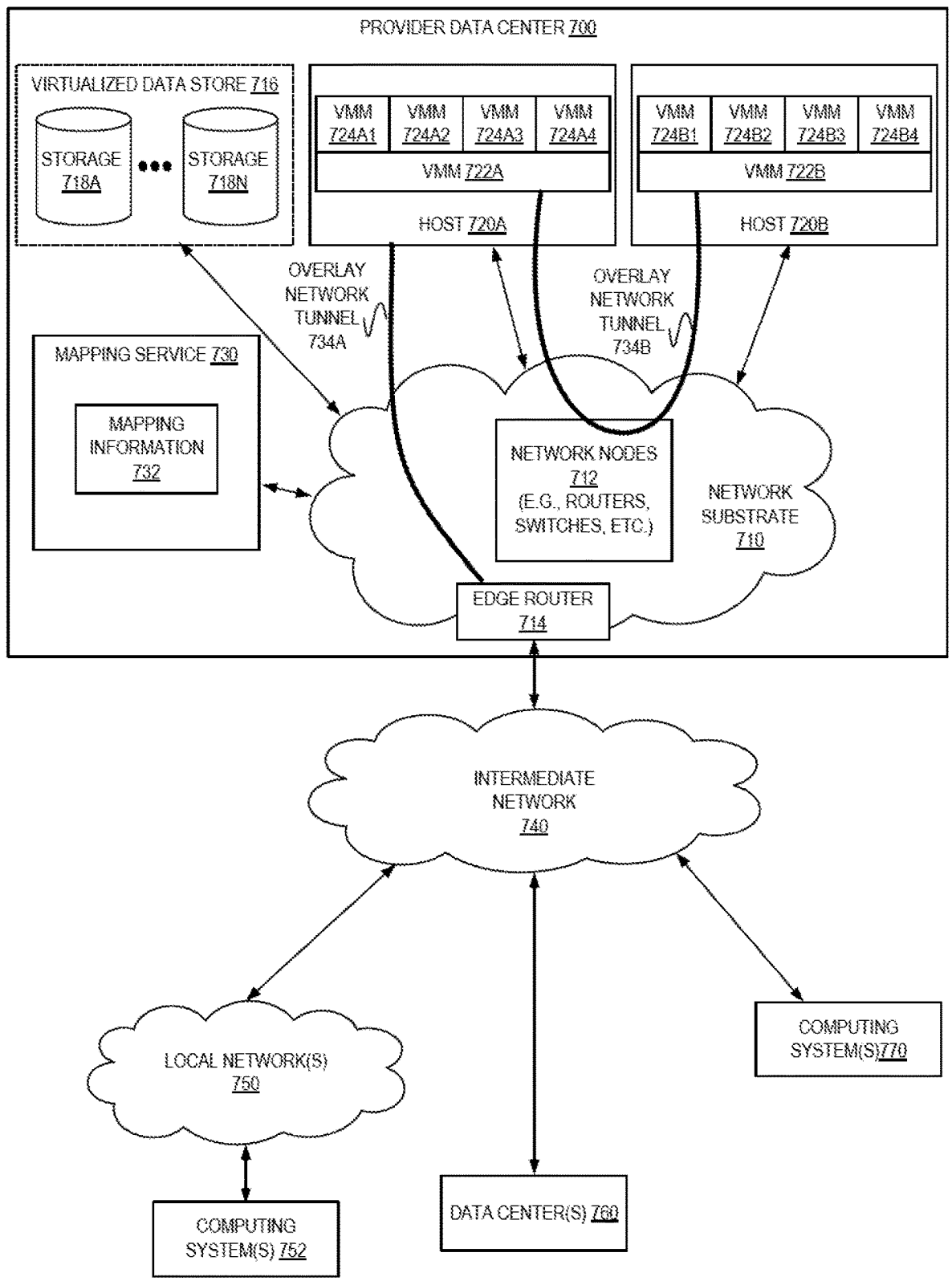
FIG. 7 illustrates an example data center that implements an overlay network on a network substrate using IP tunneling technology according to some embodiments.

FIG. 7 illustrates an example data center that implements an overlay network on a network substrate using IP tunneling technology, according to some embodiments. A provider data center 700 may include a network substrate that includes networking devices 712 such as routers, switches, network address translators (NATs), and so on. Some embodiments may employ an Internet Protocol (IP) tunneling technology to provide an overlay network via which encapsulated packets may be passed through network substrate 710 using tunnels. The IP tunneling technology may provide a mapping and encapsulating system for creating an overlay network on a network (e.g., a local network in data center 700 of FIG. 7) and may provide a separate namespace for the overlay layer (the public IP addresses) and the network substrate 710 layer (the local IP addresses). Packets in the overlay layer may be checked against a mapping directory (e.g., provided by mapping service 730) to determine what their tunnel substrate target (local IP address) should be. The IP tunneling technology provides a virtual network topology (the overlay network); the interfaces (e.g., service APIs) that are presented to customers are attached to the overlay network so that when a customer provides an IP address to which the customer wants to send packets, the IP address is run in virtual space by communicating with a mapping service (e.g., mapping service 730) that knows where the IP overlay addresses are.

In some embodiments, the IP tunneling technology may map IP overlay addresses (public IP addresses) to substrate IP addresses (local IP addresses), encapsulate the packets in a tunnel between the two namespaces, and deliver the packet to the correct endpoint via the tunnel, where the encapsulation is stripped from the packet. In FIG. 7, an example overlay network tunnel 734A from a VM 724A on host 720A to a device on the intermediate network 750 and an example overlay network tunnel 734B between a VM 724B on host 720B and a VM 724C on host 720C are shown. In some embodiments, a packet may be encapsulated in an overlay network packet format before sending, and the overlay network packet may be stripped after receiving. In other embodiments, instead of encapsulating packets in overlay network packets, an overlay network address (public IP address) may be embedded in a substrate address (local IP address) of a packet before sending, and stripped from the packet address upon receiving. As an example, the overlay network may be implemented using 32-bit IPv4 (Internet Protocol version 4) addresses as the public IP addresses, and the IPv4 addresses may be embedded as part of 128-bit IPv6 (Internet Protocol version 6) addresses used on the substrate network as the local IP addresses.

Referring to FIG. 7, at least some networks in which embodiments may be implemented may include hardware virtualization technology that enables multiple operating systems to run concurrently on a host computer (e.g., hosts 720A and 720B of FIG. 7), i.e. as VMs 724 on the hosts 720. The VMs 724 may, for example, be executed in slots on the hosts 720 that are rented or leased to customers of a network provider. A hypervisor, or virtual machine monitor (VMM) 722, on a host 720 presents the VMs 724 on the host with a virtual platform and monitors the execution of the VMs 724. Each VM 724 may be provided with one or more local IP addresses; the VMM 722 on a host 720 may be aware of the local IP addresses of the VMs 724 on the host. A mapping service 730 may be aware of all network IP prefixes and the IP addresses of routers or other devices serving IP addresses on the local network. This includes the IP addresses of the VMMs 722 serving multiple VMs 724. The mapping service 730 may be centralized, for example on a server system, or alternatively may be distributed among two or more server systems or other devices on the network. A network may, for example, use the mapping service technology and IP tunneling technology to, for example, route data packets between VMs 724 on different hosts 720 within the data center 700 network; note that an interior gateway protocol (IGP) may be used to exchange routing information within such a local network.

In addition, a network such as the provider data center 700 network (which is sometimes referred to as an autonomous system (AS)) may use the mapping service technology, IP tunneling technology, and routing service technology to route packets from the VMs 724 to Internet destinations, and from Internet sources to the VMs 724. Note that an external gateway protocol (EGP) or border gateway protocol (BGP) is typically used for Internet routing between sources and destinations on the Internet. FIG. 7 shows an example provider data center 700 implementing a network that provides resource virtualization technology and that provides full Internet access via edge router(s) 714 that connect to Internet transit providers, according to some embodiments. The provider data center 700 may, for example, provide customers the ability to implement virtual computing systems (VMs 724) via a hardware virtualization service and the ability to implement virtualized data stores 716 on storage resources 718 via a storage virtualization service.

The data center 700 network may implement IP tunneling technology, mapping service technology, and a routing service technology to route traffic to and from virtualized resources, for example to route packets from the VMs 724 on hosts 720 in data center 700 to Internet destinations, and from Internet sources to the VMs 724. Internet sources and destinations may, for example, include computing systems 770 connected to the intermediate network 740 and computing systems 752 connected to local networks 750 that connect to the intermediate network 740 (e.g., via edge router(s) 714 that connect the network 750 to Internet transit providers). The provider data center 700 network may also route packets between resources in data center 700, for example from a VM 724 on a host 720 in data center 700 to other VMs 724 on the same host or on other hosts 720 in data center 700.

A service provider that provides data center 700 may also provide additional data center(s) 760 that include hardware virtualization technology similar to data center 700 and that may also be connected to intermediate network 740. Packets may be forwarded from data center 700 to other data centers 760, for example from a VM 724 on a host 720 in data center 700 to another VM on another host in another, similar data center 760, and vice versa.

While the above describes hardware virtualization technology that enables multiple operating systems to run concurrently on host computers as VMs on the hosts, where the VMs may be instantiated on slots on hosts that are rented or leased to customers of the network provider, the hardware virtualization technology may also be used to provide other computing resources, for example storage resources 718, as virtualized resources to customers of a network provider in a similar manner.

Figure 8:
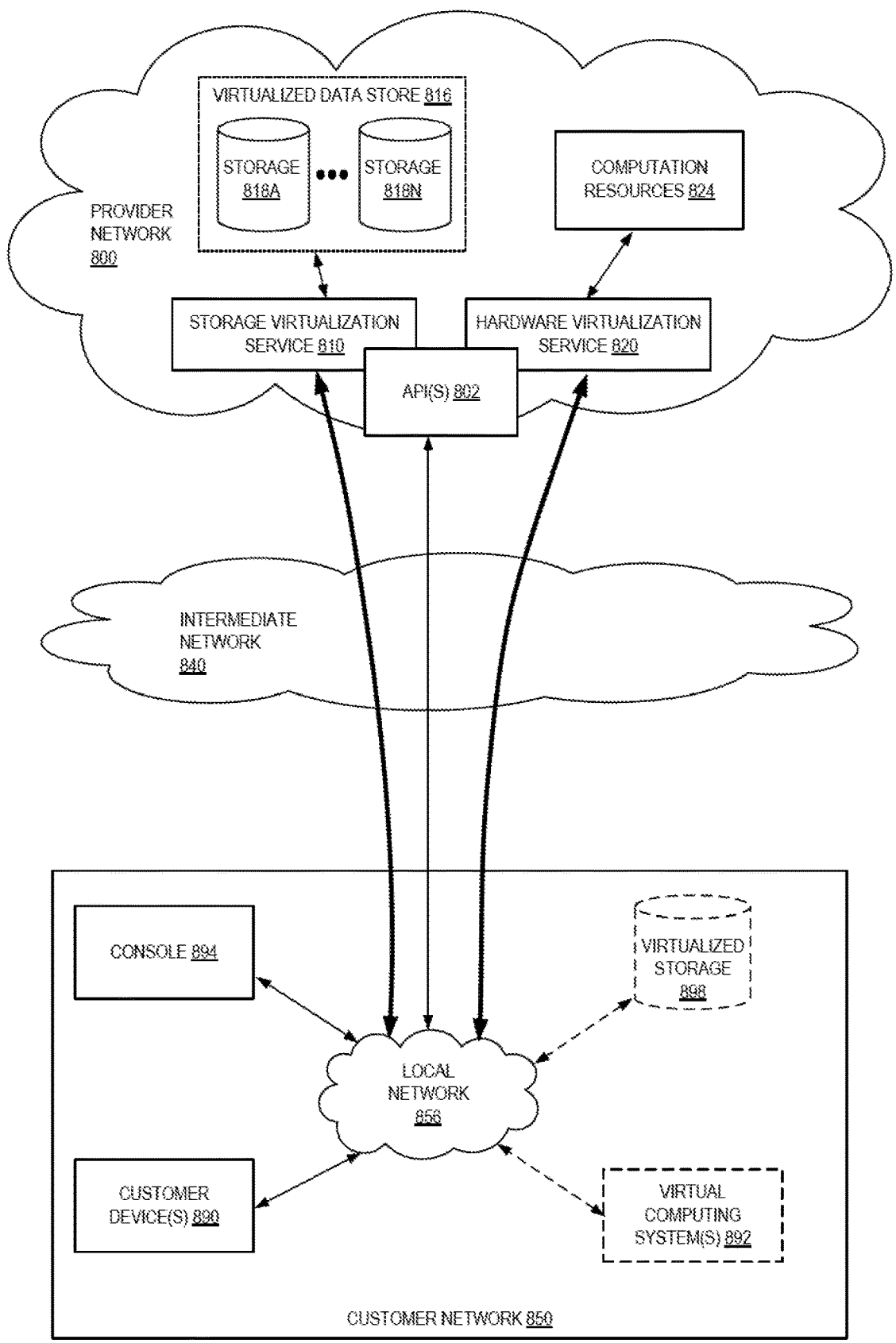
FIG. 8 is a block diagram of an example provider network that provides a storage virtualization service and a hardware virtualization service to customers according to some embodiments.

FIG. 8 is a block diagram of an example provider network that provides a storage virtualization service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894. In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 or console 894, the customer may access the functionality of storage virtualization service 810, for example via one or more APIs 802, to access data from and store data to a virtual data store 816 provided by the provider network 800. In some embodiments, a virtualized data store gateway (not shown) may be provided at the customer network 850 that may locally cache at least some data, for example frequently accessed or critical data, and that may communicate with virtualized data store service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes, which appear to the user as local virtualized storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Figure 9:
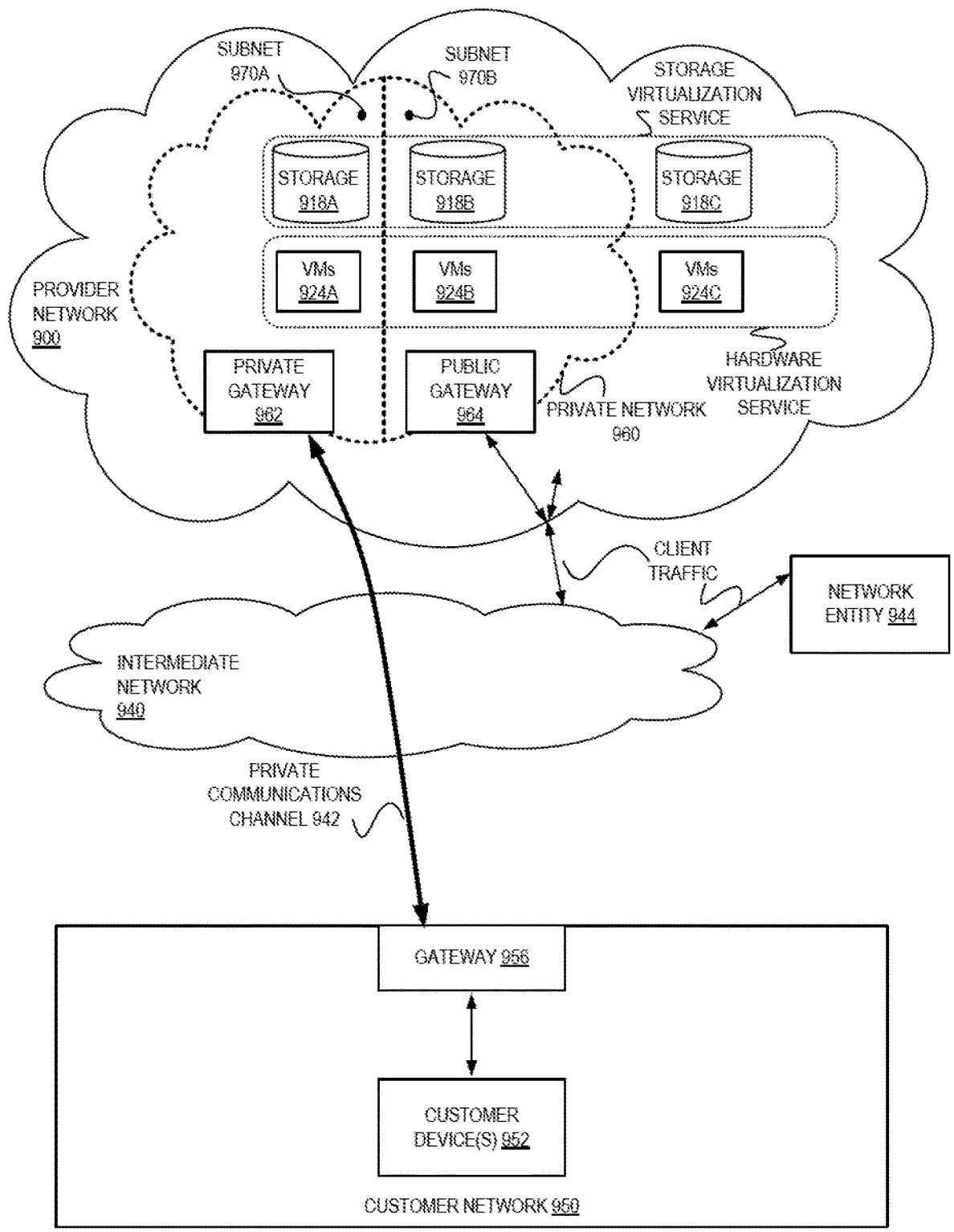
FIG. 9 illustrates an example provider network that provides virtual networks on the provider network to at least some customers according to some embodiments.

FIG. 9 illustrates an example provider network that provides virtual networks on the provider network to at least some customers, according to some embodiments. A customer's virtual network 960 on a provider network 900, for example, enables a customer to connect their existing infrastructure (e.g., devices 952) on customer network 950 to a set of logically isolated resource instances (e.g., VMs 924A and 924B and storage 918A and 918B), and to extend management capabilities such as security services, firewalls, and intrusion detection systems to include their resource instances.

A customer's virtual network 960 may be connected to a customer network 950 via a private communications channel 942. A private communications channel 942 may, for example, be a tunnel implemented according to a network tunneling technology or some other technology over an intermediate network 940. The intermediate network may, for example, be a shared network or a public network such as the Internet. Alternatively, a private communications channel 942 may be implemented over a direct, dedicated connection between virtual network 960 and customer network 950.

A public network may be broadly defined as a network that provides open access to and interconnectivity among a plurality of entities. The Internet, or World Wide Web (WWW) is an example of a public network. A shared network may be broadly defined as a network to which access is limited to two or more entities, in contrast to a public network to which access is not generally limited. A shared network may, for example, include one or more local area networks (LANs) and/or data center networks, or two or more LANs or data center networks that are interconnected to form a wide area network (WAN). Examples of shared networks may include, but are not limited to, corporate networks and other enterprise networks. A shared network may be anywhere in scope from a network that covers a local area to a global network. Note that a shared network may share at least some network infrastructure with a public network, and that a shared network may be coupled to one or more other networks, which may include a public network, with controlled access between the other network(s) and the shared network. A shared network may also be viewed as a private network, in contrast to a public network such as the Internet. In some embodiments, either a shared network or a public network may serve as an intermediate network between a provider network and a customer network.

To establish a virtual network 960 for a customer on provider network 900, one or more resource instances (e.g., VMs 924A and 924B and storage 918A and 918B) may be allocated to the virtual network 960. Note that other resource instances (e.g., storage 918C and VMs 924C) may remain available on the provider network 900 for other customer usage. A range of public IP addresses may also be allocated to the virtual network 960. In addition, one or more networking devices (routers, switches, etc.) of the provider network 900 may be allocated to the virtual network 960. A private communications channel 942 may be established between a private gateway 962 at virtual network 960 and a gateway 956 at customer network 950.

In some embodiments, in addition to, or instead of, a private gateway 962, virtual network 960 may include a public gateway 964 that enables resources within virtual network 960 to communicate directly with entities (e.g., network entity 944) via intermediate network 940, and vice versa, instead of or in addition to via private communications channel 942.

Virtual network 960 may be, but is not necessarily, subdivided into two or more subnetworks, or subnets, 970.

For example, in implementations that include both a private gateway 962 and a public gateway 964, a virtual network 960 may be subdivided into a subnet 970A that includes resources (VMs 924A and storage 918A, in this example) reachable through private gateway 962, and a subnet 970B that includes resources (VMs 924B and storage 918B, in this example) reachable through public gateway 964.

The customer may assign particular customer public IP addresses to particular resource instances in virtual network 960. A network entity 944 on intermediate network 940 may then send traffic to a public IP address published by the customer; the traffic is routed, by the provider network 900, to the associated resource instance. Return traffic from the resource instance is routed, by the provider network 900, back to the network entity 944 over intermediate network 940. Note that routing traffic between a resource instance and a network entity 944 may require network address translation to translate between the public IP address and the local IP address of the resource instance.

Some embodiments may allow a customer to remap public IP addresses in a customer's virtual network 960 as illustrated in FIG. 9 to devices on the customer's external network 950. When a packet is received (e.g., from network entity 944), the network 900 may determine that the destination IP address indicated by the packet has been remapped to an endpoint on external network 950 and handle routing of the packet to the respective endpoint, either via private communications channel 942 or via the intermediate network 940. Response traffic may be routed from the endpoint to the network entity 944 through the provider network 900, or alternatively may be directly routed to the network entity 944 by the customer network 950. From the perspective of the network entity 944, it appears as if the network entity 944 is communicating with the public IP address of the customer on the provider network 900. However, the network entity 944 has actually communicated with the endpoint on customer network 950.

While FIG. 9 shows network entity 944 on intermediate network 940 and external to provider network 900, a network entity may be an entity on provider network 900. For example, one of the resource instances provided by provider network 900 may be a network entity that sends traffic to a public IP address published by the customer.

Figure 10:
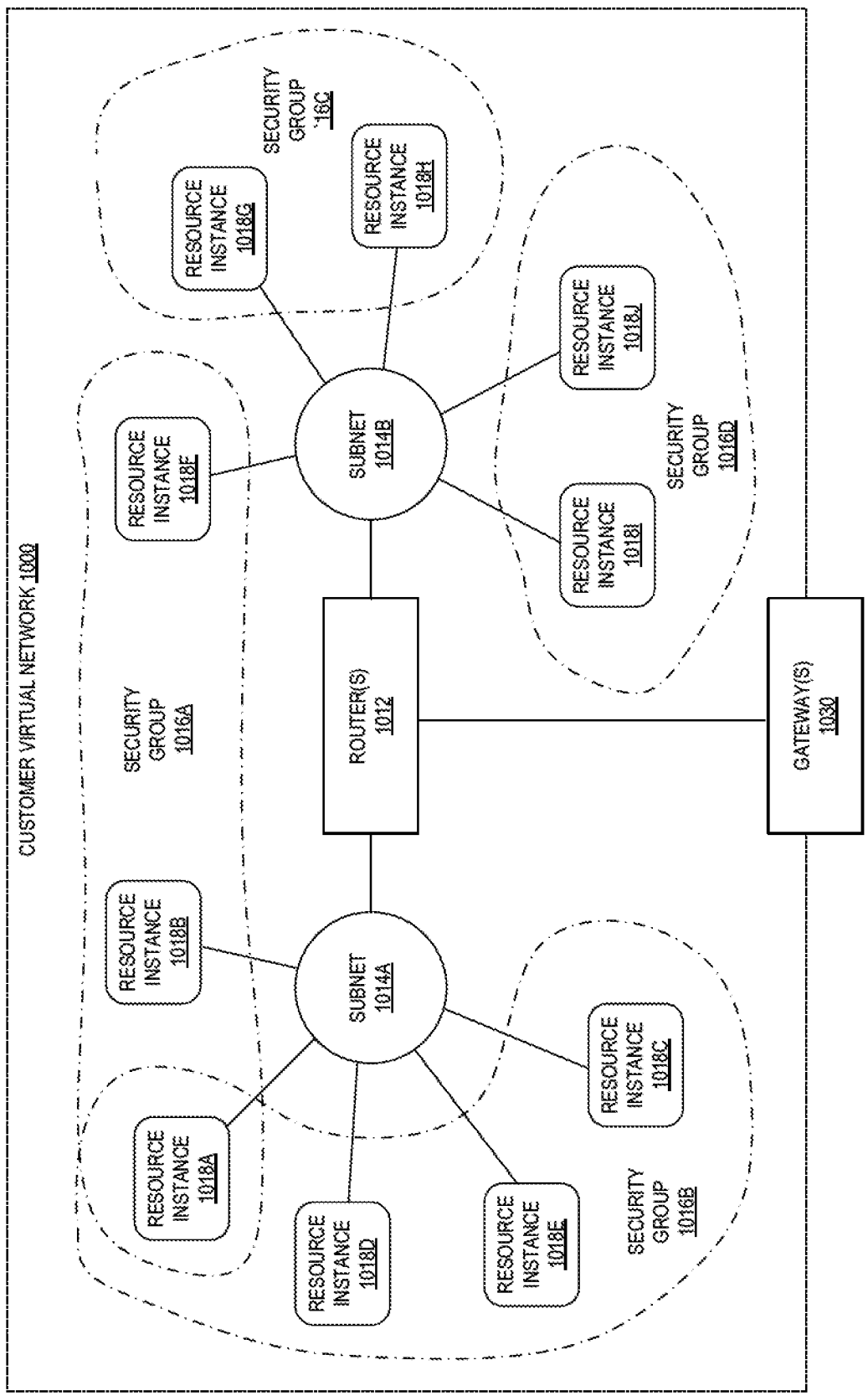
FIG. 10 illustrates subnets and security groups in an example virtual network on a provider network according to some embodiments.

FIG. 10 illustrates subnets and security groups in an example virtual network on a provider network, according to some embodiments. In some embodiments, a provider network such as provider network 900 in FIG. 9 may allow the customer to establish and manage virtual security groups 1016 within the customer's virtual network 1010, within or across subnets 1014. A security group 1016 is a logical grouping of resource instances 1018 and acts as a virtual firewall that controls the traffic allowed to reach one or more resource instances 1018 within the security group 1016 according to security group rules. The customer may establish one or more security groups 1016 within the virtual network 1010, and may associate each resource instance 1018 in the virtual network 1010 with one or more of the security groups 1016. In some embodiments, the customer may establish and/or modify rules for each security group 1016 that control the inbound traffic allowed to reach the resource instances 1018 associated with the security group 1016.

In the example virtual network 1010 shown in FIG. 10, the virtual network 1010 is subdivided into two subnets 1014A and 1014B. Access to the virtual network 1010 is controlled by gateway(s) 1030. Each subnet 1014 may include at least one router 1012 that acts to route traffic to (and from) resource instances 1018 on the respective subnet 1014. In some embodiments, network access control lists (ACLs) may be used to control access to the subnets 1014 at router(s) 1012. In the example shown in FIG. 10, resource instances 1018A through 1018E are on subnet 1014A, and resource instances 1018F through 1018J are on subnet 1014B. The customer has established four security groups 1016A through 1016D. As shown in FIG. 10, a security group may extend across subnets 1014, as does security group 1016A that includes resource instances 1018A and 1018B on subnet 1014A and resource instance 1018F on subnet 1014B. In addition, a resource instance 1018 may be included in two or more security groups 1016, as is resource instance 1018A which is included in security group 1016A and 1016B.

Illustrative System

Figure 11:
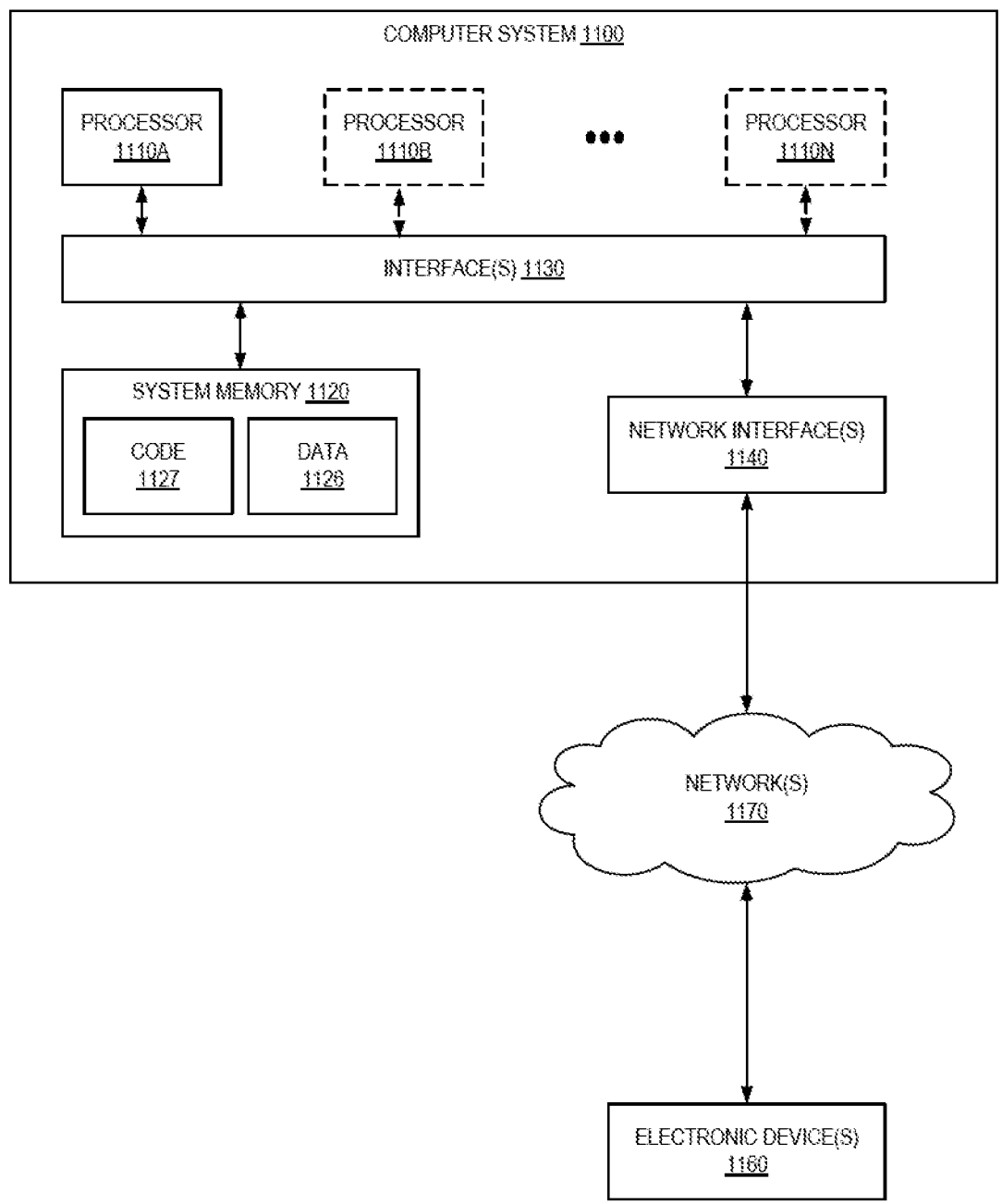
FIG. 11 is a block diagram illustrating an example computer system that may be used in some embodiments.

In some embodiments, a system that implements a portion or all of the techniques for dynamic allocation of network address spaces of virtual networks implemented in service provider network environments as described herein may include a general-purpose computer system that includes or is configured to access one or more computer-accessible media, such as computer system 1100 illustrated in FIG. 11. In the illustrated embodiment, computer system 1100 includes one or more processors 1110 coupled to a system memory 1120 via an input/output (I/O) interface 1130. Computer system 1100 further includes a network interface 1140 coupled to I/O interface 1130. While FIG. 11 shows computer system 1100 as a single computing device, in various embodiments a computer system 1100 may include one computing device or any number of computing devices configured to work together as a single computer system 1100.

In various embodiments, computer system 1100 may be a uniprocessor system including one processor 1110, or a multiprocessor system including several processors 1110 (e.g., two, four, eight, or another suitable number). Processors 1110 may be any suitable processors capable of executing instructions. For example, in various embodiments, processors 1110 may be general-purpose or embedded processors implementing any of a variety of instruction set architectures (ISAs), such as the x86, PowerPC, SPARC, or MIPS ISAs, or any other suitable ISA In multiprocessor systems, each of processors 1110 may commonly, but not necessarily, implement the same ISA.

System memory 1120 may store instructions and data accessible by processor(s) 1110. In various embodiments, system memory 1120 may be implemented using any suitable memory technology, such as static random-access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above for resizing virtual networks in provider network environments, are shown stored within system memory 1120 as code 1125 and data 1126.

In one embodiment, I/O interface 1130 may be configured to coordinate I/O traffic between processor 1110, system memory 1120, and any peripheral devices in the device, including network interface 1140 or other peripheral interfaces. In some embodiments, I/O interface 1130 may perform any necessary protocol, timing or other data transformations to convert data signals from one component (e.g., system memory 1120) into a format suitable for use by another component (e.g., processor 1110). In some embodiments, I/O interface 1130 may include support for devices attached through various types of peripheral buses, such as a variant of the Peripheral Component Interconnect (PCI) bus standard or the Universal Serial Bus (USB) standard, for example. In some embodiments, the function of I/O interface 1130 may be split into two or more separate components, such as a north bridge and a south bridge, for example. Also, in some embodiments some or all of the functionality of I/O interface 1130, such as an interface to system memory 1120, may be incorporated directly into processor 1110.

Network interface 1140 may be configured to allow data to be exchanged between computer system 1100 and other devices 1160 attached to a network or networks 1111, such as other computer systems or devices as illustrated in FIG. 1, for example. In various embodiments, network interface 1140 may support communication via any suitable wired or wireless general data networks, such as types of Ethernet network, for example. Additionally, network interface 1140 may support communication via telecommunications/telephony networks such as analog voice networks or digital fiber communications networks, via storage area networks (SANs) such as Fibre Channel SANs, or via I/O any other suitable type of network and/or protocol.

In some embodiments, system memory 1120 may be one embodiment of a computer-accessible medium configured to store program instructions and data as described above for FIG. 1 for providing customer hosted endpoints in provider network environments. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1100 via I/O interface 1130. A non-transitory computer-accessible storage medium may also include any volatile or non-volatile media such as RAM (e.g. SDRAM, double data rate (DDR) SDRAM, SRAM, etc.), read only memory (ROM), etc., that may be included in some embodiments of computer system 1100 as system memory 1120 or another type of memory. Further, a computer-accessible medium may include transmission media or signals such as electrical, electromagnetic, or digital signals, conveyed via a communication medium such as a network and/or a wireless link, such as may be implemented via network interface 1140.

Various embodiments may further include receiving, sending, or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 108A-108Z) may be used to indicate that there can be one or multiple instances of the referenced entity in some embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

The invention claimed is:

1. A computer-implemented method comprising:
    determining that a condition of an allocation rule is satisfied, wherein the condition is based on a current utilization of network addresses within a network address space associated with a virtual network implemented in a service provider system, wherein the network address space has an initial size;
    determining a new size for the network address space that is different than the initial size; and
    configuring the network address space associated with the virtual network to be of the new size.

2. The computer-implemented method of claim 1, further comprising:
    receiving, via an application programming interface (API) of the service provider system, a request to configure the allocation rule to dynamically allocate the network address space for the virtual network.

3. The computer-implemented method of claim 2, wherein the request further comprises an allocation factor that indicates how the network address space is to be changed when the condition is satisfied, and wherein the determining the new size is based at least in part on the allocation factor.

4. The computer-implemented method of claim 1, wherein:
    the new size is larger than the initial size;

prior to the configuring of the network address space to be of the new size, the network address space comprises a first range of network addresses; and after the configuring of the network address space to be of the new size, the network address space comprises a second range of network addresses.

5. The computer-implemented method of claim 4, wherein the second range of network addresses is contiguous with the first range of network addresses, and wherein after the configuring of the network address space to be of the new size the network address space further comprises the first range of network addresses.

6. The computer-implemented method of claim 4, wherein the second range of network addresses is not contiguous with the first range of network addresses.

7. The computer-implemented method of claim 4, further comprising:
receiving, via an application programming interface (API), a request that specifies at least one subnet for the virtual network that is to be configured within the second range of network addresses; and
configuring the at least one subnet in the virtual network.

8. The computer-implemented method of claim 7, further comprising:
receiving, via the API, a request that indicates that one or more resource instances are to be launched in the at least one subnet of the virtual network;
launching the one or more resource instances; and
assigning network addresses from the second range of network addresses to the one or more resource instances.

9. The computer-implemented method of claim 4, further comprising:
determining that the second range of network addresses does not conflict with a third range of network addresses.

10. The computer-implemented method of claim 9, wherein the third range of network addresses includes one or more of:
one or more addresses of another virtual network implemented by the service provider system, wherein the another virtual network is connected to the virtual network via a peering connection; or
one or more network addresses of another network that is external to the service provider system that is connected to the virtual network across an intermediate network.

11. The computer-implemented method of claim 1, wherein the new size is smaller than the initial size.

12. The computer-implemented method of claim 11, further comprising:
determining that a range of network addresses that are within the network address space are not utilized,
wherein configuring the network address space of the virtual network to be of the new size comprises removing the range of network addresses from the network address space.

13. The computer-implemented method of claim 1, further comprising:
after configuring the network address space of the virtual network to be of the new size, transmitting an indication that the size of the network address space has changed.

14. A system comprising:
one or more compute instances implemented by a first one or more electronic devices that operate within a virtual network implemented in a service provider system; and a control plane implemented by a second one or more electronic devices, wherein the control plane comprises instructions which, when executed by the second one or more electronic devices, cause the control plane to:
determine whether a condition of an allocation rule is satisfied, wherein the condition is based on a current utilization of network addresses within a network address space associated with the virtual network, wherein the network address space has an initial size;
determine a new size for the network address space that is different than the initial size; and
configure the network address space associated with the virtual network to be of the new size.

15. The system of claim 14, wherein the instructions, when executed by the second one or more electronic devices, further cause the control plane to:
receive, via an application programming interface (API) of the service provider system, a request to configure the allocation rule to dynamically allocate the network address space for the virtual network.

16. The system of claim 14, wherein:
the new size is larger than the initial size;
prior to the configuring of the network address space to be of the new size, the network address space comprises a first range of network addresses; and
after the configuring of the network address space to be of the new size, the network address space comprises a second range of network addresses.

17. The system of claim 14, wherein:
the new size is smaller than the initial size;
the instructions, when executed by the second one or more electronic devices, further cause the control plane to determine that a range of network addresses that are within the network address space are not utilized; and
the control plane, to configure the network address space of the virtual network to be of the new size, is to remove the range of network addresses from the network address space.

18. A non-transitory computer readable storage medium having instructions which, when executed by one or more processors of one or more computing devices, cause the one or more computing devices to implement a control plane of a service provider system to perform operations comprising:
determining that a condition of an allocation rule is satisfied, wherein the condition is based on a current utilization of network addresses within a network address space associated with a virtual network implemented in the service provider system, wherein the network address space has an initial size;
determining a new size for the network address space that is different than the initial size; and
configuring the network address space associated with the virtual network to be of the new size.

19. The non-transitory computer readable storage medium of claim 18, further comprising:
receiving, via an application programming interface (API) of the service provider system, a request to configure the allocation rule to dynamically allocate the network address space for the virtual network.

20. The non-transitory computer readable storage medium of claim 19, wherein the request further comprises an allocation factor that indicates how the network address space is to be changed when the condition is satisfied, and wherein the determining the new size is based at least in part on the allocation factor.

* * * * *